United States Patent [19]
Yuhara et al.

[11] Patent Number: 5,677,973
[45] Date of Patent: Oct. 14, 1997

[54] METHOD OF ALIGNING OPTICAL FIBER TO OPTICAL FIBER OR OPTICAL FIBER TO OPTICAL ELEMENT AT JUNCTION AND OPTICAL FIBER ARRAY

[75] Inventors: Toshiya Yuhara; Hisao Iitsuka, both of Hitachi; Hiroshi Kajioka, Moriya-machi; Mamoru Ichimura; Tomohiro Murakami, both of Komaki, all of Japan

[73] Assignee: Hitachi Cable Co., Ltd., Tokyo, Japan

[21] Appl. No.: 497,374

[22] Filed: Jun. 30, 1995

[30] Foreign Application Priority Data

Jul. 1, 1994 [JP] Japan .................................. 6-150969
Jul. 1, 1994 [JP] Japan .................................. 6-150970

[51] Int. Cl.$^6$ .................................. G02B 6/36
[52] U.S. Cl. .................................. 385/90; 385/97; 385/96; 385/99
[58] Field of Search .................................. 385/90, 96, 97, 385/98, 99, 88, 89, 134, 32

[56] References Cited

U.S. PATENT DOCUMENTS 5,383,118  1/1995  Nguyen .................................. 385/134 X

FOREIGN PATENT DOCUMENTS 1147506  6/1989  Japan .

*Primary Examiner*—Phan T. H. Palmer
*Attorney, Agent, or Firm*—Antonelli, Terry, Stout & Kraus, LLP.

[57] ABSTRACT

The orientation of the rotating direction of an optical fiber in an optical fiber array takes the positional axial displacement into consideration. In a method of aligning the orientation of optical fibers, or the axial displacement in an optical fiber array having a plurality of optical fibers, and an optical fiber holding member, an enlarged image of the optical fiber is obtained for each of the optical fibers using an image pick-up means. Then, a distribution of the characterized image corresponding to the positions in the radial direction of the image of the optical fiber are obtained from the enlarged image. From the distribution of the characterized image, the orientation of the rotational direction to the center of the optical fiber, or the positional axial displacement of the core center, is measured. Based on the measured result, the orientation of the rotational direction, or the positional axial displacement to the holding member of the optical fiber, is aligned with an optical fiber rotating mechanism.

27 Claims, 20 Drawing Sheets

METHOD OF ALIGNING OPTICAL FIBER TO OPTICAL FIBER OR OPTICAL FIBER TO OPTICAL ELEMENT AT JUNCTION AND OPTICAL FIBER ARRAY

BACKGROUND OF THE INVENTION

The present invention relates to a method of aligning optical fibers and to an optical fiber array used in a junction of an optical fiber to an optical fiber, or in a junction of an optical fiber to an optical element used in an optical waveguide, such as an optical fiber gyroscope, an optical modulator, and an optical switch.

As an example of a junction between an optical waveguide and an optical fiber with axially asymmetric refractive index distribution, there is an optical fiber array using polarization-maintaining fibers. The method of aligning the angle of the rotating direction of the polarization-maintaining optical fiber, that is, the method of aligning the main axis of birefringence, involves aligning the angle of an optical fiber to an optical fiber holding member using an angle of linear polarized light at the output port of the optical fiber obtained by propagating linear polarized light having the oscillatory direction of its electric field parallel to the main axis of birefringence in the optical fiber.

For example, as seen in FIG. 18, the rays of light emitted from a semiconductor laser 31 are formed into nearly parallel rays of light using a first lens 32, and the parallel rays are formed into linearly polarized light using a polarizer 33. Then, the polarized light is concentrated using a second lens 34 adjacent one end of a polarization-maintaining optical fiber 36 supported by a holder 35, rotatable around the center axis of the core, so the light is propagated inside the optical fiber. On the other end, the optical fiber radiating the propagated light is mounted in a V-shaped groove (not shown) in an optical fiber holding member 37 after passing through a holder 35, which is rotatable around the center axis of the core, and a cover member 38 is placed on the optical fiber holding member 37.

Since the polarization-maintaining optical fiber has two main axes of birefringence intersecting at a right angle, it cannot be determined which main axis the oscillatory direction of the linear polarized light propagating inside the optical fiber is parallel to unless the approximate angle of the main axis of birefringence is known.

For this reason, when the alignment of the angle of the main axis of birefringence is performed using only the oscillatory direction of the electric field of the linear polarized light radiated out of the optical fiber, there is a possibility of selecting a different angle from the desired angle by 90°. Therefore, in any alignment procedure using the angle of linear polarized light, it is necessary to align the main axis of birefringence as nearly as possible with the desired direction and to limit the range of rotation of the output port of the optical fiber within the error range of this alignment.

In a case where an elliptical core optical fiber 42 is used as the polarization-maintaining optical fiber 36, the major axis 44 and the minor axis 45 of an elliptical core 43 become the main axes of birefringence, as shown in FIG. 19. Therefore, the main axis of birefringence can be set nearly to the desired direction by rotating the output port of the optical fiber mounted on a holding member, while a near-field pattern of the output light from the optical fiber is observed using a CCD camera (not shown) or a far-field pattern of the output light projected on a screen (not shown) is observed. In a case where an elliptical jacket type polarization-maintaining optical fiber 46 is used as the polarization-maintaining optical fiber 36, the major axis 48 and the minor axis 49 of an elliptical jacket 47 become the main axes of birefringence, as shown in FIG. 20. Therefore, the main axis of birefringence can be set to nearly the desired direction by etching the output port of the optical fiber mounted on a holding member using an aqueous solution of hydro-fluoride to form a step between the jacket portion and the other portions, so that the shape of the jacket portion is observable, and by rotating the output port of the optical fiber, while the enlarged image of the optical fiber is observed using a CCD camera.

Next, the output light is collected by a photo-receiver 41 through a third lens 39 and an analyzer 40, and the rotational position of the input port which results in minimum polarization cross-talk is obtained by rotating the input port of the optical fiber and the analyzer 40, while the output of the photo-receiver 41 is monitored. When one of the main axes of birefringence of the optical fiber at the input port agrees with the oscillatory direction of the electric field, the oscillatory direction of the electric field of the output light from the optical fiber becomes linearly polarized light parallel to one of the two main axes of birefringence. Then, the direction of the analyzer 40 is set to the desired direction of the main axis of birefringence, and the main axis of birefringence is aligned with a rotational direction where the output of the photo-receiver 41 becomes a maximum or minimum value by rotating the output port of the optical fiber within the error range of the alignment using the near-field pattern or the far-field pattern in the case of the elliptical core optical fiber, or within the error range of the alignment using the enlarged image of the port in the case of the elliptical jacket type polarization-maintaining optical fiber, for example, within ±10°.

In the aforementioned conventional method of aligning the main axis of birefringence of a polarization-maintaining optical fiber 36 to a desired direction, it is required to perform various kinds of processing other than rotating the optical fiber 36 mounted on the holding member 37 around the center axis of the core as the approximate rotational axis.

It is required to form flat end planes in the both ends of the optical fiber for input and output coupling of light. The alignment is required to couple the light which passes through the first lens 32, the polarizer 33 and the second lens 34 to the optical fiber 36. The alignment of the rotational direction of the input port of the optical fiber 36 is required to change the light propagating inside the optical fiber 36 into linearly polarized light having the oscillatory direction of the electrical field parallel to the main axis of birefringence. This means that, in order to perform an alignment of the angle of the main axis of birefringence of the output port of the polarization-maintaining optical fiber mounted on the holding member 37, it is required to perform alignment of the angle of the main axis of birefringence of the input port.

On the other hand, in order to align the main axis of birefringence to the desired direction in advance, it is required to observe the near-field pattern of the output light from the optical fiber 36, in the case of using the elliptical core optical fiber 42 as the polarization-maintaining optical fiber 36, or the enlarged image of the surface of the output port of the optical fiber, in the case of using the elliptical jacket type polarization-maintaining optical fiber 46.

As a result, every time an optical fiber array using a polarization-maintaining optical fiber is produced, it is required to move and rearrange the CCD camera or the screen, the third lens 39, the analyzer 40 and the photo-receiver 41. In addition to these, in a case of using the elliptical jacket type polarization-maintaining optical fiber 46, it is also required to etch the end surface using an aqueous solution of hydro-fluoride. Since directing the main axis of birefringence of the polarization-maintaining optical fiber to a desired direction requires various kinds of processing, as described above, and also requires much time, it has been difficult to decrease the number of man-hours or the time needed to produce an optical fiber array using a polarization-maintaining optical fiber.

Further, if an optical fiber array is produced using plural optical fibers having an axial displacement of 0.5 μm, the error in the distance between the cores of adjacent optical fibers to a desired pitch becomes 1 μm at a maximum. Therefore, it is difficult to decrease the coupling loss due to positional displacement in the junction of the optical fiber array and a plurality of optical waveguides formed in an array.

Since the mode field size of the propagating light inside an optical waveguide and an optical fiber becomes small as the wavelength of the light propagating inside the optical fiber is short, the increasing amount of coupling loss for the same amount of displacement becomes large. Therefore, in a system using short wavelength light, such as a photo-sensor, it is important to decrease the error due to axial displacement of the core in the core pitch of the adjacent optical fibers in an optical fiber array. Further, in a case of using a low cost elliptical core type polarization-maintaining optical fiber, since the mold field size in the direction of the minor axis of the elliptical core is small in comparison to that in the major axis, it is important to produce agreement between the axial positional displacements in the direction of the minor axis for all of the optical fibers composing the optical fiber array.

However, in the conventional method of aligning the rotational direction of a polarization-maintaining optical fiber, it has been impossible to perform alignment considering the axial positional displacement, since it is required to perform various kinds of processing as described above, and the alignment takes a long time to perform.

On the other hand, a method is described in Japanese Patent Application Laid-Open No. 1-147506 (1989), in which a constant-polarization optical fiber is observed with direct view method using a TV camera, and coarse alignment of the core in the θ-direction is performed by rotating an optical fiber in the θ-direction until the images of the optical fiber in the right and left sides are observed to be the same. A brightness profile of the image of the optical fiber obtained by this method is as shown in FIG. 27. The brightness profile varies depending on the direction of the stress applying portion. Approximate aligning of the angle of the optical fiber is performed by utilizing the changes in the brightness of the upward peak value or the downward peak value in the middle portion or in the portions a at both outer sides of the middle portion b to e.

In this method of utilizing a brightness profile, the brightest portion, which is brighter than portions of the outer peripheral surface, always appears in a middle portion between portions a and e in the optical fiber.

According to an experiment conducted by the inventors, using the above method, identification of the points a to e cannot accurately be performed, because of the difference between the upward peak value and the downward peak value of the brightness in the middle portion a or in the portions at both outer sides of the middle portion b to e. Therefore, the above method may be used in practice only for performing coarse aligning of the core of an optical fiber.

SUMMARY OF THE INVENTION

The first object of the present invention is to solve the above problems and to provide a method and an optical fiber holding structure and a junction which are capable of aligning the rotational direction in a junction between an optical fiber, having an axially asymmetric refractive index distribution, and an optical waveguide easily in a short time.

The second object of the present invention is to solve the above problems and to provide a method and an optical fiber array, which are capable of aligning the orientation of the rotational direction of an optical fiber in an optical fiber array in consideration of axial displacement.

A third object of the present invention is to provide an alignment method which is capable of identifying points of a upward peak value and a downward peak value in a brightness profile with a high accuracy and which is capable of aligning an angle of an optical fiber with a high accuracy.

In order to attain the first object and the third object described above, the present invention is characterized by a method of effecting alignment between optical fibers having an axially asymmetric refractive index distribution or between an optical fiber and an optical element in a junction, the method comprising the steps of viewing the optical fiber from a direction lateral to the propagating direction of light in the fiber using an image obtaining means to obtain an enlarged image of the optical fiber, obtaining a distribution of the image characteristics corresponding to the radial positions of the optical fiber image from the obtained enlarged image, adjusting the image obtaining means so that the image characteristics at outer peripheral portions of the optical fiber are maximized in the distribution of the image characteristics, measuring an orientation of the rotational direction around the center axis of the optical fiber from the distribution of the image characteristic after said adjusting, and aligning the orientation of the rotational direction of the optical fiber with an optical fiber rotating member based on the measured result.

According to the present invention, by viewing an optical fiber from a direction lateral to the propagating direction of guided light using an image obtaining means, an enlarged image of the optical fiber can be obtained. By performing image processing on the obtained enlarged image using an image processor, a distribution of the image characteristics, such as a distribution of the light intensity, corresponding to the radial positions of the optical fiber image, can be obtained. The distribution of the image characteristic is represented by a different characteristic curve depending on the orientation of the rotational direction of the optical fiber, and this has a high reproducibility. Therefore, a rotational angle around the center axis of the optical fiber is measured from the distribution of the image characteristic. Based on the result, the orientation of the rotational direction of the optical fiber using an optical fiber rotating member to achieve alignment can be attained.

In order to attain the second object and the third object, the present invention is characterized by a method of aligning orientations of the rotational direction of optical fibers in an optical fiber array having a plurality of optical fibers and an optical fiber holding member, the method comprising the steps of obtaining an enlarged image of the optical fiber for each of the optical fibers using an image obtaining means, obtaining a distribution of the image characteristics corresponding to different radial positions of the optical fiber image from the obtained enlarged image, adjusting the image obtaining means so that the image characteristics at outer peripheral portions of the optical fiber are maximized in the distribution of the image characteristics, measuring an axial displacement of the core center to the center of the optical fiber from the distribution of the image characteristic after the adjusting, and aligning the axial displacement with respect to the optical fiber holding member using an optical fiber rotating mechanism.

According to the above construction, by viewing a plurality of optical fibers from a direction lateral to the propagating direction of light in the fiber using an image obtaining means, a plurality of enlarged images of the optical fiber can be obtained. By performing image processing on each of the plural obtained enlarged images using an image processor, a distribution of the image characteristics, such as a distribution of the light intensity, corresponding to the radial positions of the optical fiber image, can be obtained. The distribution of the image characteristic is represented by a different characteristic curve depending on the orientation of the rotational direction of the optical fiber, and this has a high reproducibility. Therefore, the rotational angle around the center axis of the optical fiber is measured from the distribution of the image characteristic. Based on the result, the axial displacement of the core with respect to the center of the optical fiber can be detected and the pitch between the cores can be set to the pitch of the core of the optical waveguides by rotating any of the optical fibers.

In order to align the main axis of birefringence with a high accuracy and a high reproducibility, it is very effective to adjust the distance between the image pick-up camera and the optical fiber so that the upward peak value of light intensity of the image at the outer periphery of the optical fiber is maximized.

Another aspect of the present invention relates to an optical fiber holding structure in which the optical fiber is held while being viewed from a direction lateral to the propagating direction of the guided light using an image obtaining means to obtain an enlarged image of the optical fiber, distribution of the image characteristics corresponding to the radial positions of the optical fiber image being obtained from the obtained enlarged image, the image obtaining means being adjusted so that the image characteristics at outer peripheral portions of the optical fiber are maximized in the distribution of the image characteristics, an orientation of the rotational direction around the center axis of the optical fiber being measured from the distribution of the image characteristic after adjusting, and the orientation of the rotational direction of the optical fiber being aligned with an optical fiber rotating member based on the measured result.

A further aspect of the present invention relates to a junction in which the optical fiber is viewed from a direction lateral to the propagating direction of light in the fiber using an image obtaining means to obtain an enlarged image of the optical fiber, distribution of the image characteristics corresponding to the radial positions of the optical fiber image being obtained from the obtained enlarged image, the image obtaining means being adjusted so that the image characteristics at outer peripheral portions of the optical fiber are maximized in the distribution of the image characteristics, an orientation of the rotational direction around the center axis of the optical fiber as the rotational axis being measured from the distribution of the image characteristic after the adjusting, and the orientation of the rotational direction of the optical fiber being aligned using an optical fiber rotating member based on the measured result.

A still further aspect of the present invention relates to a method of aligning orientations of the rotational direction of optical fibers in an optical fiber array including a plurality of optical fibers having an axially asymmetric refractive index distribution and an optical fiber holding member, the method comprising the steps of obtaining enlarged images of the optical fiber in various rotational directions with respect to the center axis of the optical fiber from a direction lateral to the propagating direction of a guided wave in the optical fiber for each of the optical fibers using an image obtaining means, obtaining a distribution of the image characteristics corresponding to the radial positions of the optical fiber image from the obtained enlarged images, aligning a predetermined specific axis on the cross sectional plane of the optical fiber to the optical axis of the image obtaining means by detecting that orientation of the rotational direction of the optical fiber which will provide a predetermined distribution of the image characteristic, measuring an axial displacement of the core center to the center of the optical fiber from the distribution of the image characteristic, and aligning or presetting the optical axis of the image obtaining means to the holding member for each of the optical fibers so that the orientation of the specific axis is directed in a desired direction with respect to the optical fiber holding member when the specific axis of all the optical fibers are aligned in parallel to the optical axis of the image obtaining means by rotating the optical fibers, in which the positions of axial displacement do not agree with the desired positions, or in which more than a half-number of the positions of axial displacement do not agree with the desired positions by 180°.

A further aspect of the present invention relates to an optical fiber array having a plurality of optical fibers and an optical fiber holding member, wherein an enlarged image of the optical fiber for each of the optical fibers is obtained using an image obtaining means, distribution of the image characteristics corresponding to the radial positions of the optical fiber image being obtained from the obtained enlarged image, the image obtaining means being adjusted so that the image characteristics at outer peripheral portions of the optical fiber are maximized in the distribution of the image characteristics, an axial displacement of the core center to the center of the optical fiber being measured from the distribution of the image characteristic after adjusting, and the pitches of the cores being adjusted or made uniform by aligning the axial displacement to the optical fiber holding member with an optical fiber rotating mechanism.

DETAILED DESCRIPTION OF THE PREFERRED EMBODIMENTS

Figure 1:
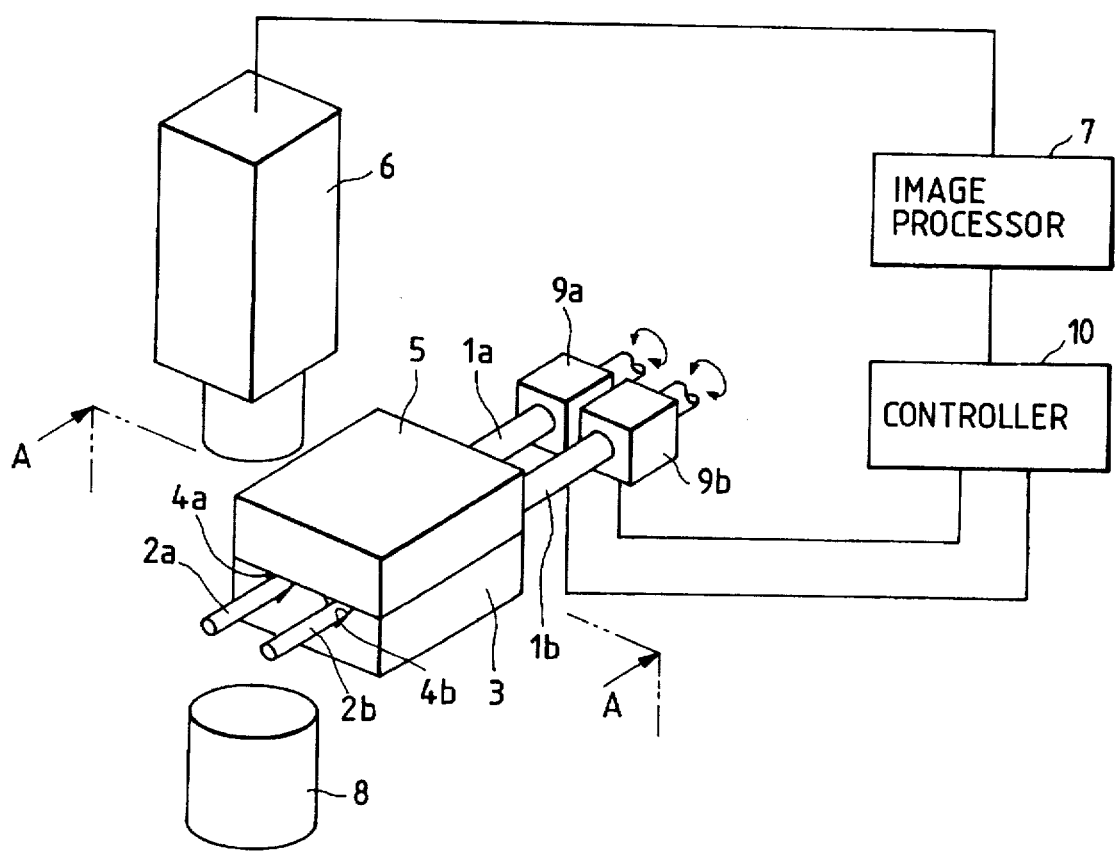
FIG. 1 is a diagrammatic view showing the outline of the main part of an embodiment of an apparatus using a method in accordance with the present invention of aligning the rotational direction of an optical fiber having an axially asymmetric refractive index distribution.

An embodiment of the present invention will be described in detail below, referring to the accompanying drawings. FIG. 1 is a view showing the outline of the main part of an embodiment of an apparatus using a method in accordance with the present invention of aligning the rotational direction of an optical fiber having an axially asymmetric refractive index distribution. Here, description will be made of a case where an optical fiber array is manufactured by using an elliptical core type polarization-maintaining optical fiber 1 as the optical fiber.

As shown in FIG. 1, two optical fibers 1a, 1b having their coating removed at the top end portions 2a, 2b, are mounted in two parallel V-shaped grooves 4a, 4b formed in an optical fiber holding member 3 and an ultraviolet-setting type adhesive (not shown) is applied thereto, this assembly being covered with a covering member 5. Since the rear end portions of the polarization-maintaining optical fibers are attached to optical fiber rotating mechanisms 9a, 9b operating as optical fiber rotating members, the top end portions 2a, 2b are rotatable substantially around the center axes of the cores of the optical fibers 1a, 1b. The rotating mechanisms 9a, 9b are driven by a controller 10 to adjust the angle of the main axis of birefringence of each optical fiber to a desired angle.

The operation of the embodiment will be described below, referring to FIG. 2 to FIG. 14B.

Figure 3:
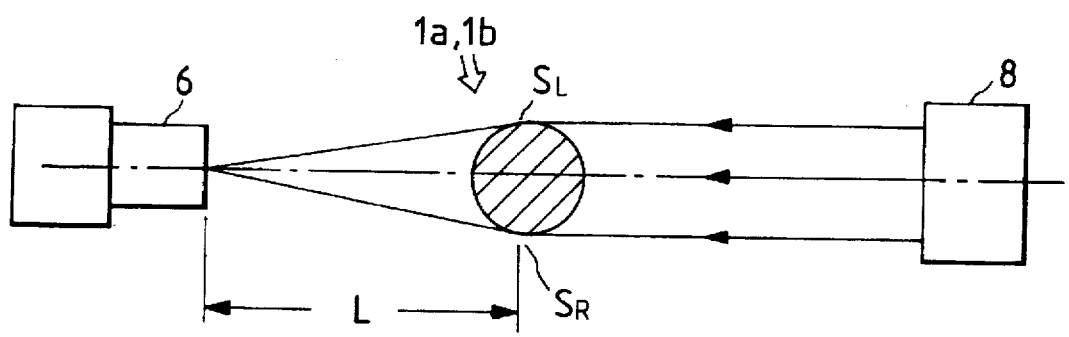
FIG. 3 is a diagram showing the relationship among an image pick-up camera, an optical fiber and a light source in the apparatus of FIG. 1.

Initially, the two optical fibers 1a, 1b, having the coating removed from the top end portions 2a, 2b, are mounted on the two V-shaped grooves 4a, 4b for supporting the optical fibers. As shown in FIG. 3, the optical fiber 1a, the angle of the main axis of birefringence of which is to be aligned, among the two polarization-maintaining optical fibers 1a, 1b, is placed on the optical axis of an image pick-up camera 6 between the image pick-up camera 6 and a light source 8.

Figure 2:
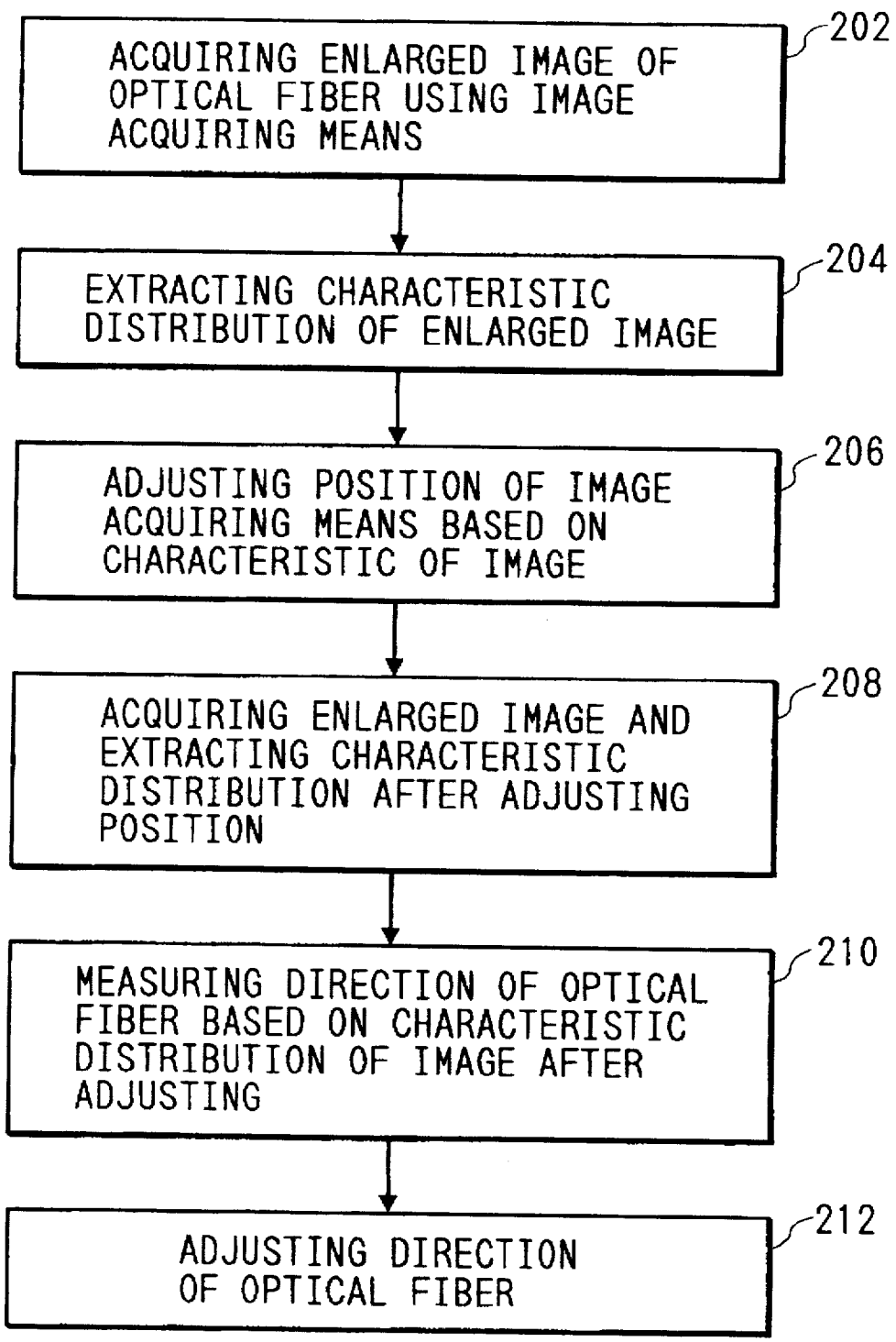
FIG. 2 is a flow chart showing the steps of the method of aligning the rotational direction of an optical fiber using the apparatus of FIG. 1.

Next, using the image pick-up camera 6 as an image obtaining means, the optical fiber is viewed from a direction lateral to the propagation direction of waveguided light to obtain an enlarged image of the optical fiber (Step 202 of FIG. 2). That is, light is radiated from the light source 8 in the lateral direction from below the optical fiber 1a so as to cross the core, and the light passes through the optical fiber 1a to obtain an enlarged image of the top end portion of the optical fiber 1a, as shown in FIG. 5B and the subsequent figures, with the CCD image pick-up camera 6.

Then, a distribution of the image characteristic corresponding to the radial position of the optical fiber is obtained from the obtained enlarged image (Step 204). That is, a distribution of light intensity corresponding to the radial position of the image of the optical fiber (not shown) can be calculated from the obtained data using an image processor 7.

Next, in the distribution of the image characteristic, the image obtaining means is adjusted so that the image characteristic of the outer periphery of the optical fiber is maximized (Step 206). That is, as shown in FIG. 3, the distance L between the camera and the optical fiber is varied and adjusted so that the peaks l, r in the light intensity of the image at the outer periphery (side end portions) $S_L$, $S_R$ of the optical fiber are maximized among the whole enlarged image.

Then, a distribution of the image characteristic corresponding to the radial direction of the optical fiber is obtained from the obtained enlarged image (Step 208). Further, the orientation of the rotating direction of the optical fiber around the center axis of the optical fiber, representing the rotational axis, is measured from the distribution of the image characteristic after adjustment (Step 210). The distribution of the light intensity has a different characteristic depending on the angle of the main axis of birefringence. The reason for this is that the refractive indexes of constituent elements of the polarization-maintaining optical fiber, such as those of the core, the cladding and the jacket, are different from one another, and at least one of the shapes of the constituent elements is asymmetric.

Then, the orientation of the rotational direction of the optical fiber is aligned using the optical fiber rotating member based on the result of the measurement (Step 212). That is, by judging the angle of the main axis of birefringence using the image processor 7 and by driving the rotating mechanism 9a mounting the optical fiber 1a, the angle of the main axis of birefringence of which is to be aligned, using the controller 10, the angle of the main axis of birefringence can be aligned by rotating the optical fiber through a desired angle.

Figure 4:
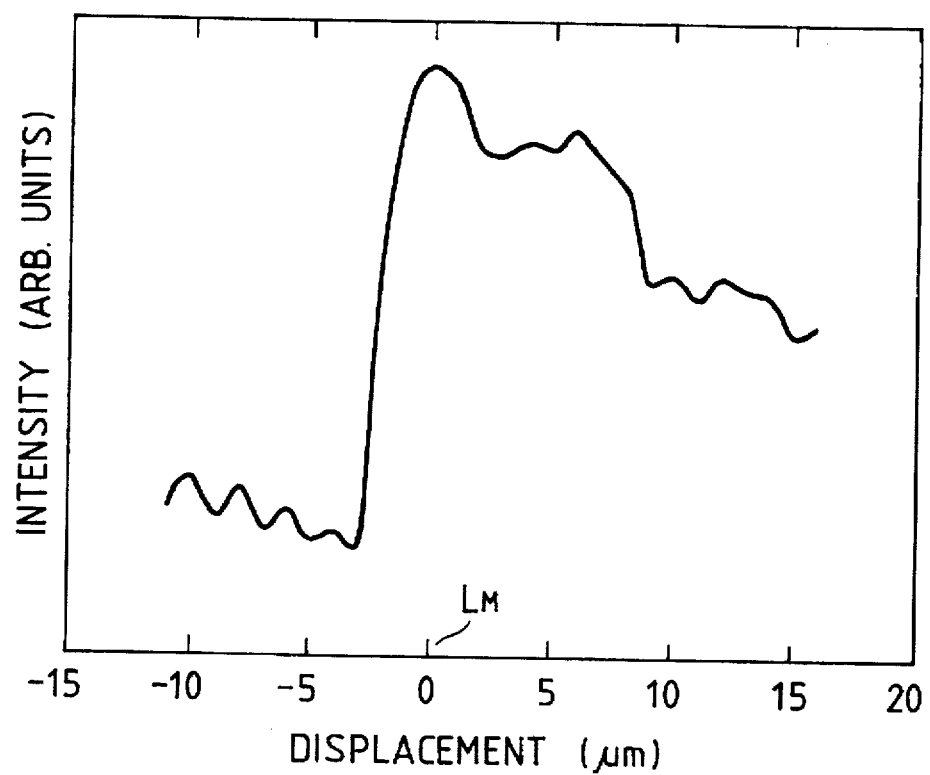
FIG. 4 is a graph showing the characteristic of light intensity at a distance between an image pick-up camera and an optical fiber of $L_M$ where the upward peak values 1 and r of the light intensity of the image in the outer peripheral portion of the optical fiber are maximized.

FIG. 4 shows a change in the upward peak values of the light intensity of the image of the outer peripheral portions (side end portions) of the optical fiber when the distance L between the image pick-up camera and the optical fiber is varied. The optical fiber used in this measurement is an elliptical core type optical fiber whose coating is removed, and which has an outer diameter of 80 µm. The abscissa indicates the moving distance of the camera, in which the origin "0" is the position $L_M$ where the upward peak values of the light intensity of the image in the outer peripheral portion of the optical fiber are maximized. The unit of measure is µm. The ordinate indicates the value of light intensity at the upper peak positions converted using an A/D converter, and the zero level is the light intensity received by the CCD camera under a dark condition.

Figure 5A:
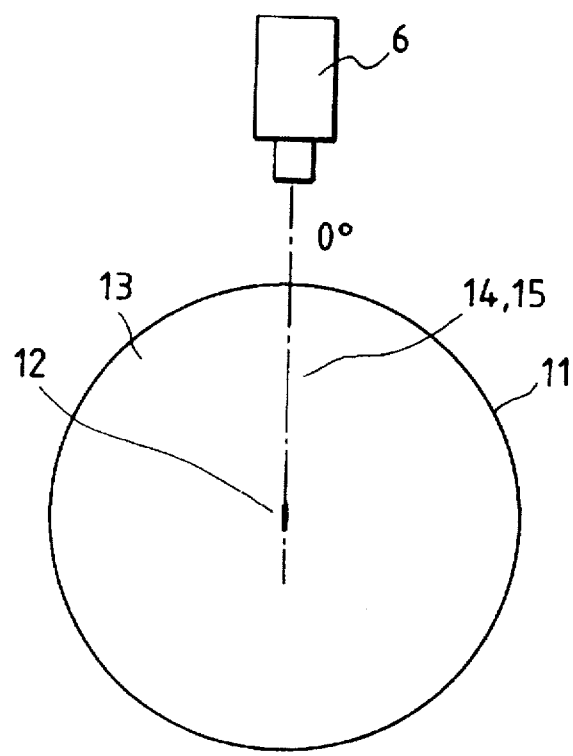
FIG. 5A is a schematic view showing an elliptical core type optical fiber where the angle between the optical axis of an image pick-up camera and the main axis of birefringence in the direction of the major axis of the elliptical core is 0°.
Figure 5B:
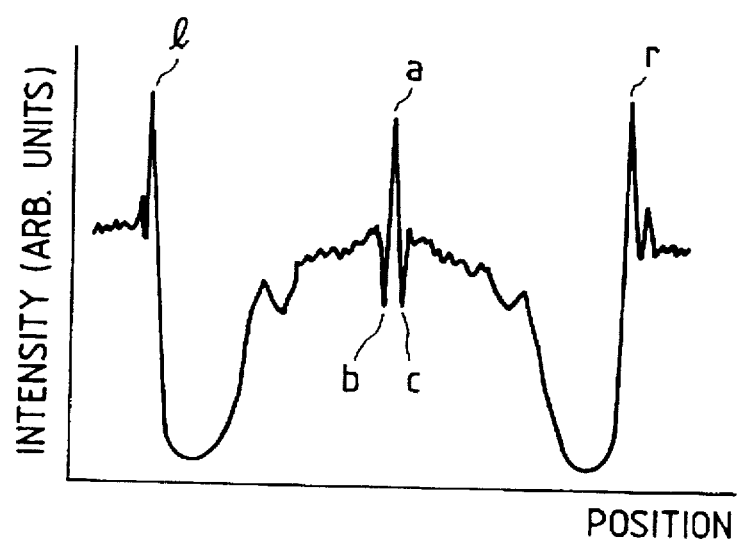
FIG. 5B is a graph showing the light intensity distribution under that condition.
Figure 6A:
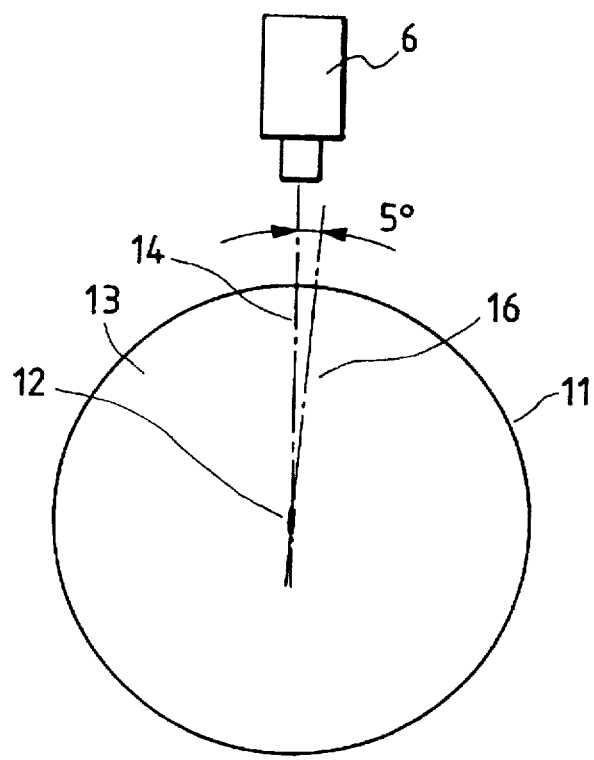
FIG. 6A is a schematic view showing an elliptical core type optical fiber where the angle between the optical axis of an image pick-up camera and the main axis of birefringence in the direction of the major axis of the elliptical core is 5°.

FIG. 5A is a schematic view showing an elliptical core type polarization-maintaining optical fiber where the angle between the optical axis of an image pick-up camera and the main axis of birefringence in the direction of the major axis of the elliptical core is 0°, and FIG. 5B is a graph showing the light intensity distribution under that condition. FIG. 6A is a schematic view showing an elliptical core type polarization-maintaining optical fiber where the angle between the optical axis of an image pick-up camera and the main axis of birefringence in the direction of the major axis of the elliptical core is 5°, and FIG. 6B is a graph showing the light intensity distribution under that condition.

Figure 7A:
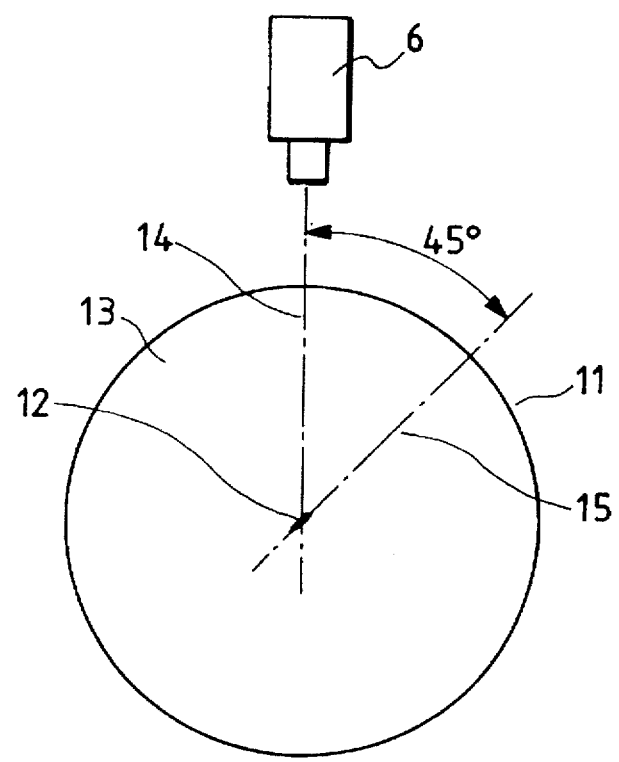
FIG. 7A is a schematic view showing an elliptical core type optical fiber where the angle between the optical axis of an image pick-up camera and the main axis of birefringence in the direction of the major axis of the elliptical core is 45°.
Figure 7B:
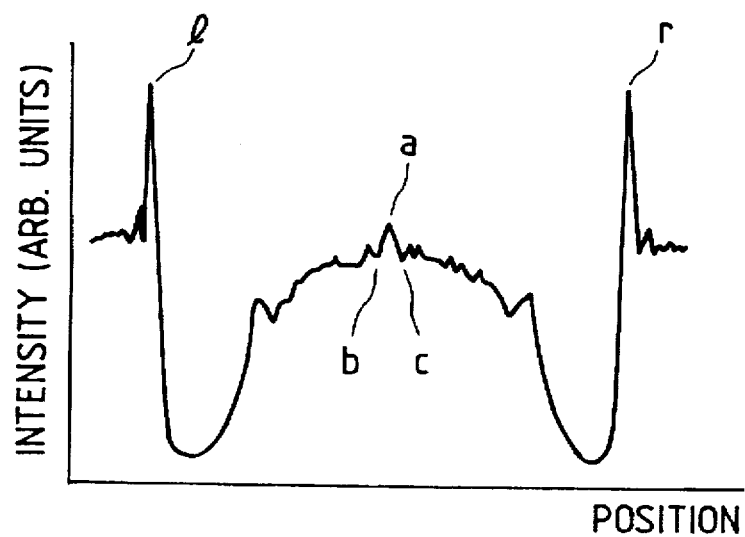
FIG. 7B is a graph showing the light intensity distribution under that condition.
Figure 8A:
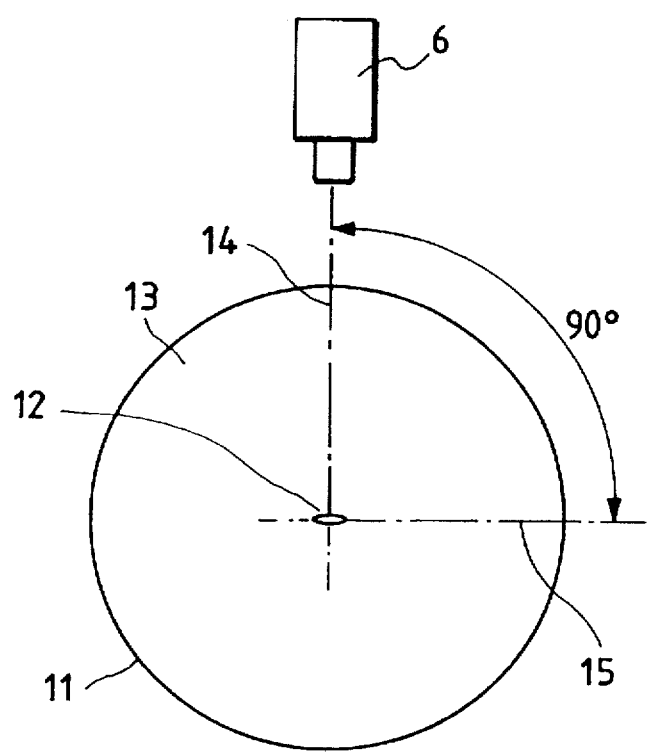
FIG. 8A is a schematic view showing an elliptical core type optical fiber where the angle between the optical axis of an image pick-up camera and the main axis of birefringence in the direction of the major axis of the elliptical core is 90°.

FIG. 7A is a schematic view showing an elliptical core type polarization-maintaining optical fiber where the angle between the optical axis of an image pick-up camera and the main axis of birefringence in the direction of the major axis of the elliptical core is 45°, and FIG. 7B is a graph showing the light intensity distribution under that condition. FIG. 8A is a schematic view showing an elliptical core type polarization-maintaining optical fiber where the angle between the optical axis of an image pick-up camera and the main axis of birefringence in the direction of the major axis of the elliptical core is 90°, and FIG. 8B is a graph showing the light intensity distribution under that condition.

Here, the distance between the image pick-up camera 6 and the optical fiber 11 is adjusted with a resolution of 0.5 µm in such a manner that the upward peak values l and r of the light intensity of the image in the outer peripheral portion $S_L$ $S_R$ of the optical fiber become maximum over the whole distribution of light intensity, as shown in FIG. 5B; that is, the light intensity of the image in the outer peripheral positions becomes larger than the light intensity at any other positions in the middle portion, for example, at the positions a to c. In a case where the optical axis 14 and the main axis of birefringence 15 are in parallel (FIG. 5A), the upward peak value a of light intensity at the center portion of the optical fiber becomes a maximum, as shown in FIG. 5B, and the downward peak values b, c appear at positions on both sides thereof, while the differences in the light intensities between a and b, and a and c are maximized. The distribution of the light intensity is nearly symmetric with regard to the position a, which corresponds to the center of the core 12, as the axis of symmetry, and the difference in light intensities between the downward peak values b and c appearing at nearly symmetric positions becomes a minimum.

Figure 6B:
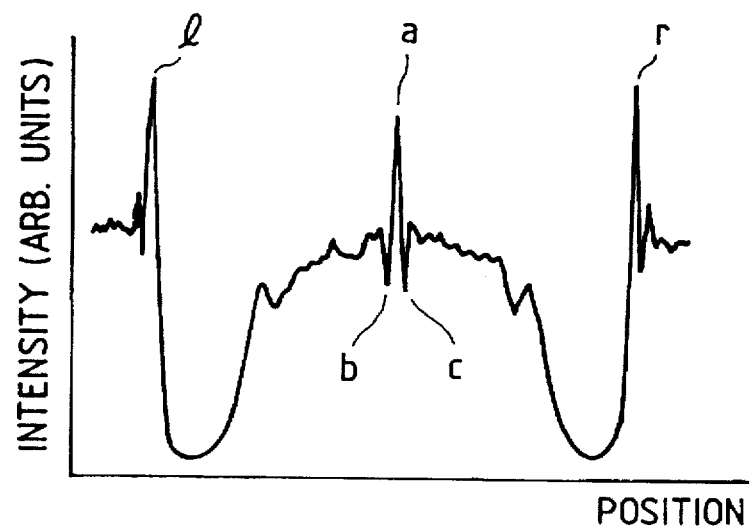
FIG. 6B is a graph showing the light intensity distribution under that condition.

When the optical fiber 11 is rotated clockwise so that the angle between the optical axis 14 and the main axis of birefringence 15 becomes 5° (FIG. 6A), as shown in FIG. 6B, the upward peak value a is smaller than the upward peak value a in FIG. 5B, and the differences in the light intensities between a and b, c are small, and the light intensity c is smaller than the light intensity b. When the optical fiber 11 is rotated clockwise so that the angle between the optical axis 14 and the main axis of birefringence 15 becomes 45° (FIG. 7A), as shown in FIG. 7B, the absolute mount of change in the light intensity in the vicinity of the upward peak value a and the downward peak values b, c is so small in comparison to those in FIG. 5B and FIG. 6B that it is difficult to discriminate the peaks, and the light intensity c becomes a little smaller than the light intensity b. Therein, in both the cases of FIGS. 6B, 7B, the upward peak values l and r are larger than the upward peak value a.

Figure 8B:
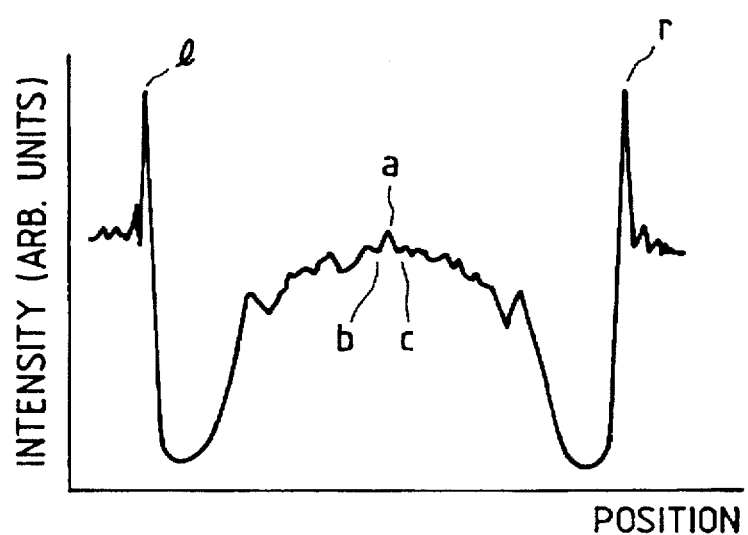
FIG. 8B is a graph showing the light intensity distribution under that condition.

On the other hand, when the optical fiber 11 is rotated clockwise so that the angle between the optical axis 14 and the main axis of birefringence 15 becomes 90° (FIG. 8A), as shown in FIG. 8B, it is difficult to discriminate the upward peak value a and the downward peak values b, c to an even greater extent than in the case of an angle of 45° (FIG. 7A, FIG. 7B), and the light intensity c and the light intensity b disappear.

As described above, by using the fact that different characteristic distributions of light intensity can be obtained corresponding to the angle of the main axis of birefringence 15, the controller 10 judges the difference in the rotational angle between the angle of the main axis of birefringence of the elliptical core type polarization-maintaining optical fiber 1 mounted on the optical fiber holding member 3 shown in FIG. 1 and a desired angle, and the rotating mechanism 9 is driven by the controller 10 so that the optical fiber 1 is rotated by this difference in the angles, and thereby the optical fiber can be aligned so that the main axis of birefringence is set to a desired angle without propagating light through the optical fiber. Since the minimum value of the gap between the upward peak value a and the downward peak value b or c is 1 µm, the resolution limited by the image pick-up element in the image pick-up camera 6 should be 1 µm or less.

A polarization-maintaining optical fiber array used as a junction to an optical waveguide is manufactured by using polarization-maintaining optical fibers 1a, 1b as elliptical core type polarization-maintaining optical fibers, rotating the main axis of birefringence to a desired angle with the alignment method described above, then hardening the adhesive with an ultraviolet ray, and polishing the end surfaces of the optical fibers 1a, 1b, the holding member 3 and the cover member 5.

When the optical axis 14 and the main axis of birefringence 15 are nearly parallel to each other, as shown in FIG. 5A, FIG. 5B, FIG. 6A and FIG. 6B, the difference in the light intensities between the upward peak value a and the downward peak value b or c is large, and accordingly the change in the distribution of light intensity is sensitive to the change in the angle of the optical fiber. Therefore, the alignment accuracy can be improved to decrease alignment error to less than 5° by repeating the process to obtain enlarged images of the optical fiber and to calculate the distributions of image characteristics while the optical fiber 11 is rotated, and once alignment of the optical axis 14 and the main axis of birefringence 15 has been accomplished, the optical fiber is then rotated by the angle difference between the angle of the holding member and the desired angle. Further, the alignment accuracy can be improved and at the same time the time required for the alignment can be shortened by predetermining the angular difference of the optical axis 14 to the holding member 3 when the optical axis 14 is parallel to the main axis of birefringence 15 so that the angle of the main axis of birefringence 15 becomes the desired angle to the holding member 3.

Since the maximum difference between the detected positions of the upward peak value and the downward peak value of the light intensities to align the main axis of birefringence 15 and the optical axis 14 is 6 µm, a range having a half-value width of 5 µm with respect to the center of the optical fiber is sufficient for the detectable range even when taking the eccentricity of the core 12 into consideration. Therewith, the time required for the image processing can be shortened.

Figure 9:
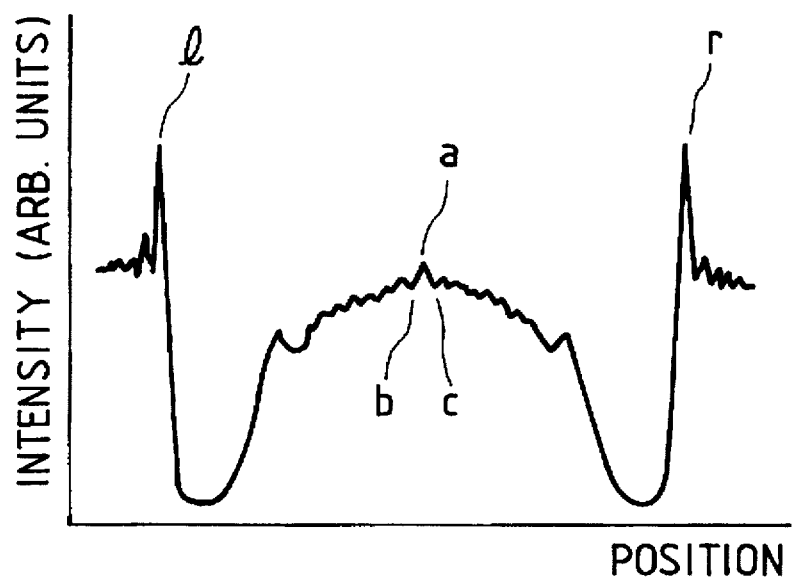
FIG. 9 is a graph showing the characteristic of light intensity at the distance L between an image pick-up camera and an optical fiber which is larger by 5 μm than $L_M$ where the upward peak values l and r of the light intensity of the image in the outer peripheral portion of the optical fiber are maximized.
Figure 10:
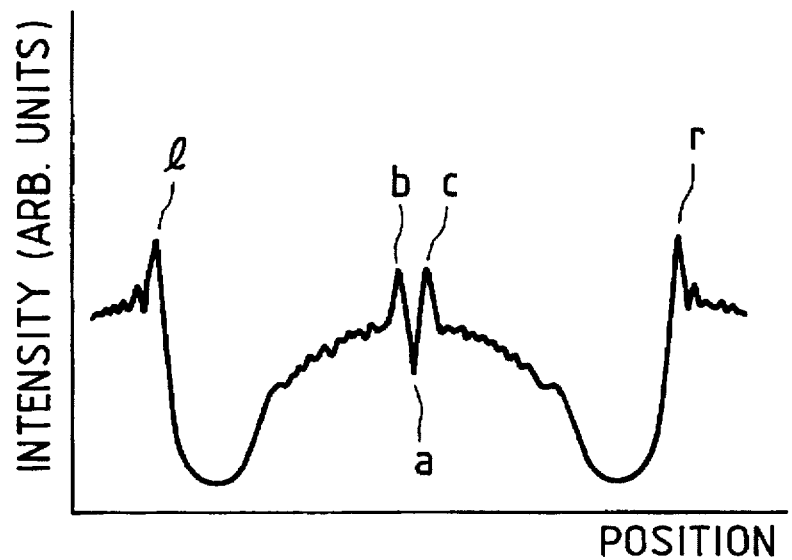
FIG. 10 is a graph showing the characteristic of light intensity at the distance L between an image pick-up camera and an optical fiber which is larger by 10 μm than $L_M$ where the upward peak values l and r of the light intensity of the image in the outer peripheral portion of the optical fiber are maximized.

FIG. 9 and FIG. 10 show the distributions of light intensity at distances between the image pick-up camera 6 and the optical fiber 11 which are larger by 5 µm and 10 µm, respectively, than the position where the upward peak values l and r of the light intensity of the image in the outer peripheral portion of the optical fiber are maximized. As the distance between the image pick-up camera 6 and the optical fiber 11 is increased, as shown in FIG. 9, the absolute amount of change in the light intensity in the vicinity of the upward peak value a and the downward peak values b, c is so small in comparison to those in FIG. 5B that it is difficult to discriminate the peaks, and then the light intensity is inverted in such a manner that the upward peak value a in FIG. 5B change to the downward peak value a in FIG. 10 and the downward peak values b, c in FIG. 5B changes to the upward peak values b, c in FIG. 10.

In order to align the main axis of birefringence with a high accuracy and a high reproducibility, it is very effective if the distance between the image pick-up camera 6 and the elliptical core type polarization-maintaining optical fiber is adjusted with resolution of 5 µm or less in such a manner that the upward peak values l and r of the light intensity of the image in the outer peripheral portion $S_L$, $S_R$ of the optical fiber become maximum over the whole distribution of light intensity, as shown in FIG. 5B, that is, when the light intensity of the image in the outer peripheral positions becomes larger than the light intensity at any of the other positions in the middle portion.

In a case where the distance between the image pick-up camera 6 and the elliptical core type polarization-maintaining optical fiber 11 is adjusted so that the light intensity in the portion corresponding to the center of the core 12 is maximum, the main axis of birefringence 15 can be also adjusted in parallel to the optical axis 14.

Description will be made below of a case where an elliptical jacket type polarization-maintaining optical fiber is used as an optical fiber having axially asymmetric refractive index distribution.

Figure 11A:
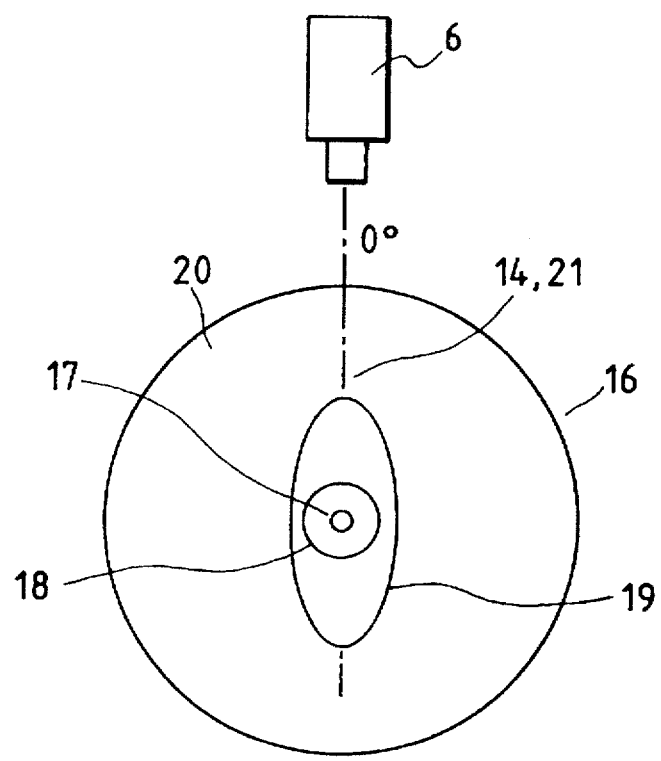
FIG. 11A is a schematic view showing an elliptical jacket type polarization-maintaining optical fiber where the angle between the optical axis of an image pick-up camera and the main axis of birefringence in the direction of the major axis of the elliptical jacket is 0°.
Figure 11B:
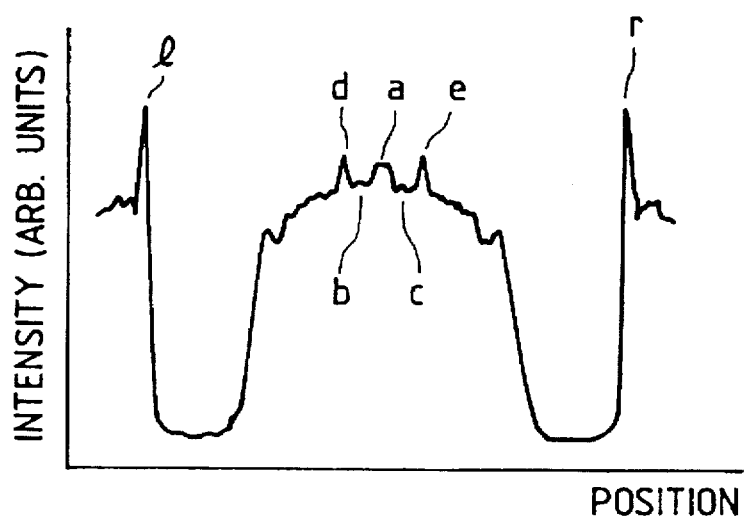
FIG. 11B is a graph showing the light intensity distribution under that condition.
Figure 12A:
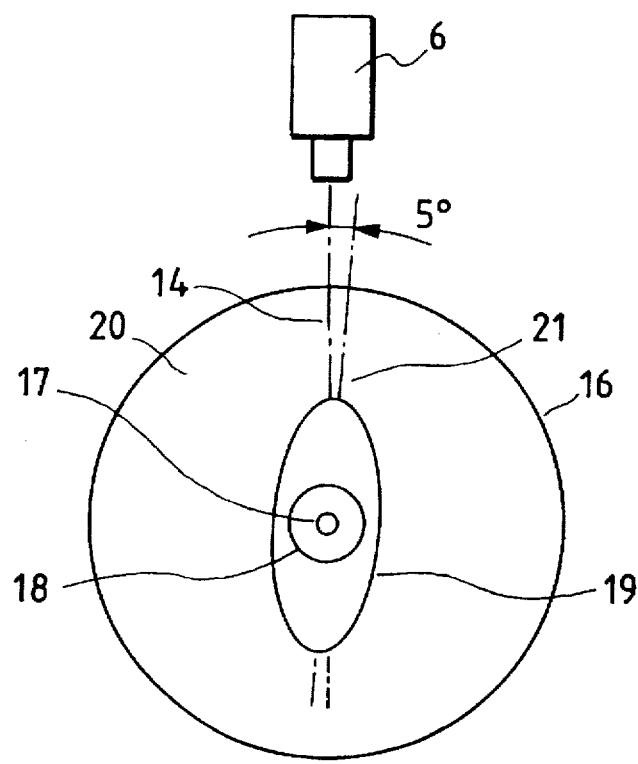
FIG. 12A is a schematic view showing an elliptical jacket type polarization-maintaining optical fiber where the angle between the optical axis of an image pick-up camera and the main axis of birefringence in the direction of the major axis of the elliptical jacket is 5°.
Figure 12B:
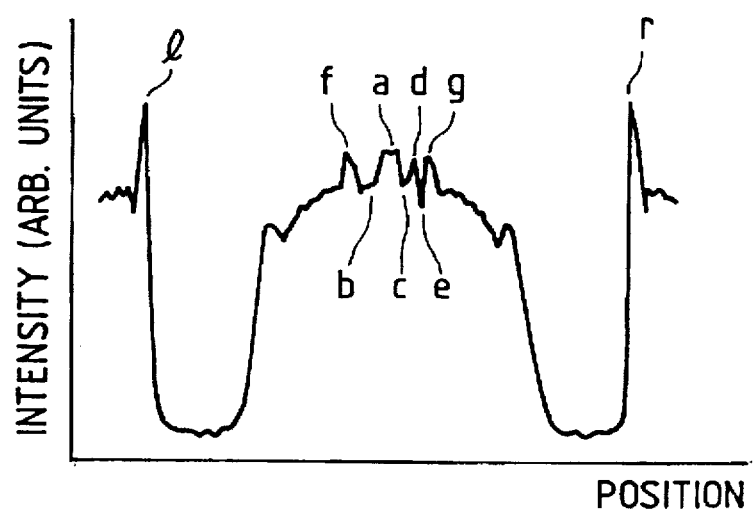
FIG. 12B is a graph showing the light intensity distribution under that condition.

FIG. 11A is a schematic view showing an elliptical jacket type polarization-maintaining optical fiber where the angle between the optical axis of an image pick-up camera and the main axis of birefringence in the direction of the major axis of the elliptical jacket is 0°, and FIG. 11B is a graph showing the light intensity distribution under that condition. FIG. 12A is a schematic view showing an elliptical jacket type polarization-maintaining optical fiber where the angle between the optical axis of an image pick-up camera and the main axis of birefringence in the direction of the major axis of the elliptical jacket is 5°, and FIG. 12B is a graph showing the light intensity distribution under that condition.

Figure 13A:
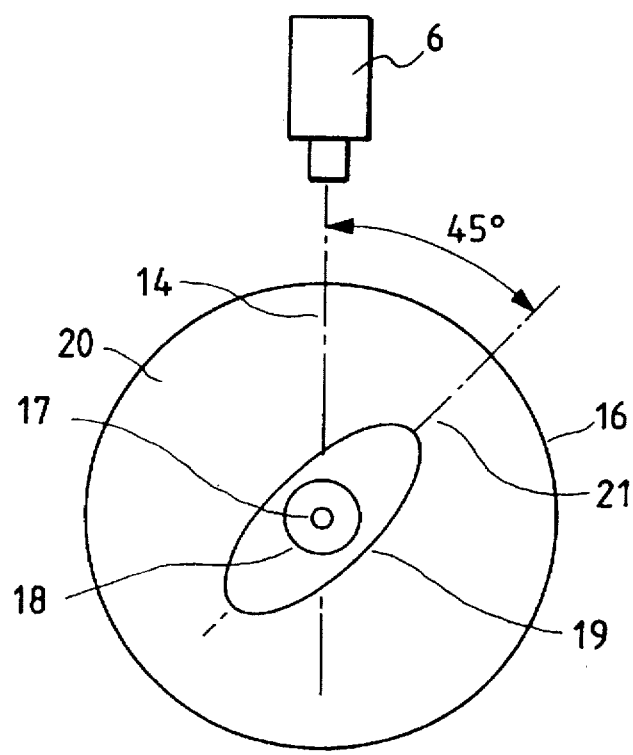
FIG. 13A is a schematic view showing an elliptical jacket type polarization-maintaining optical fiber where the angle between the optical axis of an image pick-up camera and the main axis of birefringence in the direction of the major axis of the elliptical jacket is 45°.
Figure 13B:
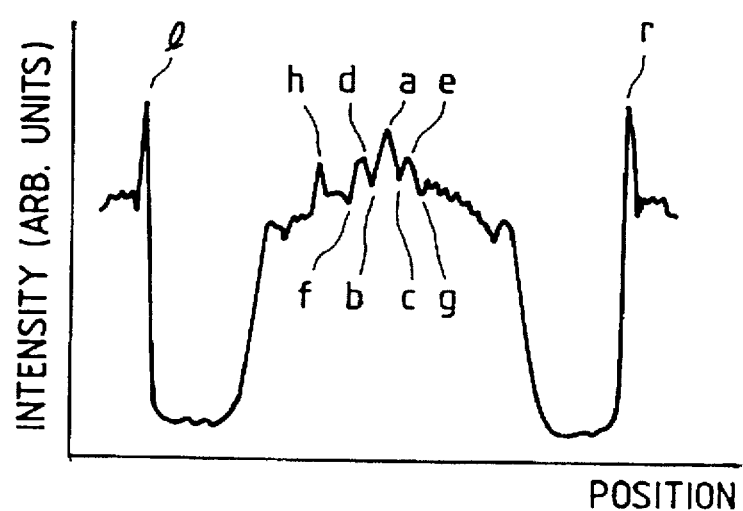
FIG. 13B is a graph showing the light intensity distribution under that condition.
Figure 14A:
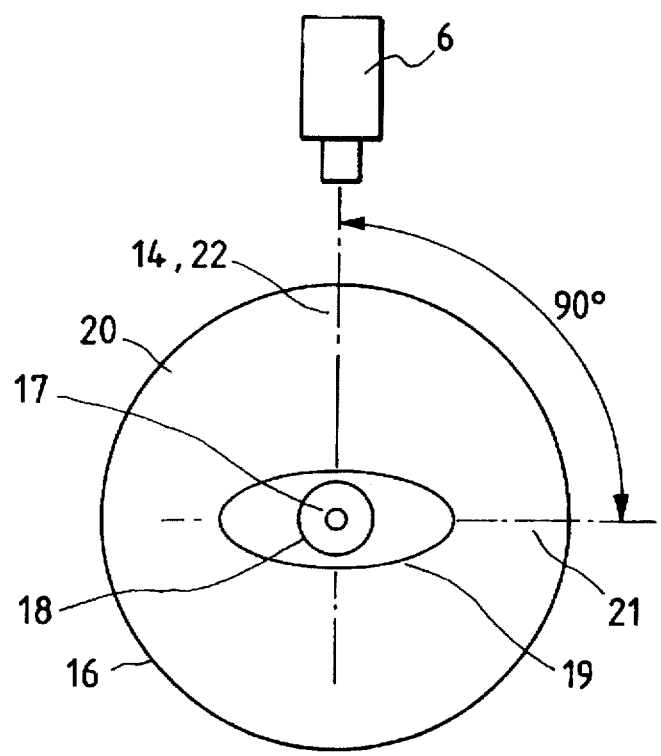
FIG. 14A is a schematic view showing an elliptical jacket type polarization-maintaining optical fiber where the angle between the optical axis of an image pick-up camera and the main axis of birefringence in the direction of the major axis of the elliptical jacket is 90°.
Figure 14B:
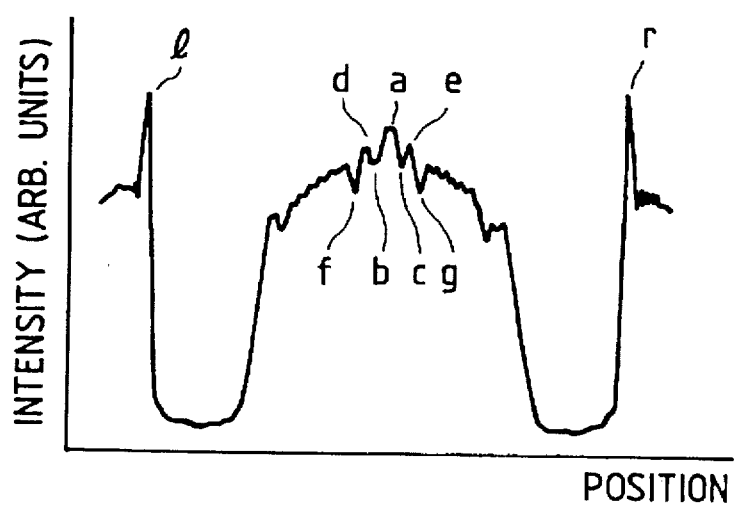
FIG. 14B is a graph showing the light intensity distribution under that condition.

FIG. 13A is a schematic view showing an elliptical jacket type polarization-maintaining optical fiber where the angle between the optical axis of an image pick-up camera and the main axis of birefringence in the direction of the major axis of the elliptical jacket is 45°, and FIG. 13B is a graph showing the light intensity distribution under that condition. FIG. 14A is a schematic view showing an elliptical jacket type polarization-maintaining optical fiber where the angle between the optical axis of an image pick-up camera and the main axis of birefringence in the direction of the major axis of the elliptical jacket is 90°, and FIG. 14B is a graph showing the light intensity distribution under that condition.

As can be seen, a clear bright portion and a dark portion do not appear in the vicinity of the middle position of the optical fiber when the optical axis 14 and the main axis of birefringence 21 are parallel (FIG. 11A) at the distance where the upward peak values l and r of the light intensity of the image in the outer periphery of the optical fiber are maximum, but appear within the range where the image pick-up camera 6 is spaced from the optical fiber by 50 μm.

Therefore, the distance between the image pick-up camera and the optical fiber 16 is adjusted with a resolution of 0.5 μm in a position 10 μm apart from the distance $L_M$ where the upward peak values l and r of the light intensity of the image become larger than a maximum in the whole distribution of the light intensity shown in FIG. 5B; that is, the light intensity of the image in the outer peripheral positions becomes larger than the light intensity at any other positions in the middle portion.

In a case where the optical axis 14 and the main axis of birefringence 15 in the major axis direction of the elliptical jacket are in parallel (FIG. 11A), as shown in FIG. 11B, the distribution of light intensity is nearly symmetric with respect to the bright portion a, which corresponds to the center of the core 12, representing the axis of symmetry. Also, a pair of bright portions d, e appear at nearly symmetric positions with respect to the axis in the vicinity of the center of the optical fiber, and the difference between the light intensities is minimized. Further, a pair of dark portions b, c appear at positions in the inner peripheral side of these bright portions d, e of the optical fiber in nearly symmetrical positions with respect to the center of the bright portion a corresponding to the center of the core, but clearly dark portions having lower light intensity than the outer periphery do not appear in the vicinity of the outer side of the bright portions d, e. When the optical fiber 11 is rotated clockwise so that the angle between the optical axis 14 and the main axis of birefringence 15 becomes 5° (FIG. 12A), as shown in FIG. 12B, the distribution of the light intensity does not remain symmetric any more, and the bight portion corresponding to e in FIG. 11A is separated into two bright portions d, g and a dark portion e appears between them.

When the optical fiber 11 is further rotated clockwise so that the angle between the optical axis 14 and the main axis of birefringence 15 becomes 45° (FIG. 13A), as shown in FIG. 13B, the distribution of the light intensity is not symmetric since a bright portion h newly appears. However, a pair of bright portions d, e appear at nearly symmetric positions with respect to the center of the bright portion a corresponding to the center of the optical fiber. Also, a pair of dark portions b, c appear at positions in the inner peripheral side of these bright portions d, e of the optical fiber in nearly symmetrical relationship, and a pair of clearly dark portions f, g having a lower light intensity than the outer periphery do not appear in the vicinity of the outer side of the bright portions d, e.

On the other hand, in a case where the angle between the optical axis 14 and the main axis of birefringence 15 is 90° (FIG. 14A), that is, in a case where the optical axis 14 and the main axis of birefringence 22 in the minor axis of the elliptical jacket are parallel, as shown in FIG. 14B, the distribution of light intensity is nearly symmetric with respect to the bright portion a corresponding to the center of the core. And, a pair of bright portions d, e appear at nearly symmetric positions with respect to the center of the bright portion a in the vicinity of the center of the optical fiber. Also, a pair of dark portions b, c appear at positions in the inner peripheral side of these bright portions d, e of the optical fiber in nearly symmetrical relationship, and a pair of clearly dark portions f, g having lower light intensity than the outer periphery do not appear in the vicinity of the outer side of the bright portions d, e.

As described above, by using the fact that the characterized distributions of light intensity can be obtained corresponding to the angle of the main axis of birefringence 15, the elliptical jacket type polarization-maintaining optical fiber mounted on the optical fiber holding member 3 shown in FIG. 1 can be aligned so that the main axis of birefringence is set to a desired angle without propagating light through the optical fiber in the same manner as the elliptical core type polarization-maintaining optical fiber. Since the minimum value of the gap between the bright portion, excluding the outer peripheral portions of the optical fiber, and the dark portion is 1.6 μm, the resolution limited by the image pick-up element in the image pick-up camera 6 should be 1.6 μm or less. It is possible for the elliptical jacket type polarization-maintaining optical fiber to improve the alignment accuracy by setting the main axis of birefringence 21 or the main axis of birefringence 22 in parallel to the optical axis 14.

This is because the distribution of the light intensity is nearly symmetric with regard to the center of the core, representing the axis of symmetry, as shown in FIG. 11B, FIG. 14B, and in addition to this, as seen in FIG. 14B, it is possible to set the main axis of birefringence 21 or the main axis of birefringence 22 in parallel to the optical axis 14 by detecting the rotating angle of the optical fiber 16 which will minimize the difference in at least one pair of light intensities in the pairs of dark portions f and g. Therein, since the region in the vicinity of the center of the optical fiber where the bright portions d and e, the dark portions b and c and the dark portions f and g are detected is within the range of a half-value width of 20 μm with regard to the center of the core, a range having a half-value width of 25 μm with respect to the center of the optical fiber is sufficient for the detectable range even when taking into consideration the eccentricities of the core 17, the cladding 18 and the jacket 19. Therewith, the time required for the image processing can be shortened.

Although, as an optical fiber having an axially asymmetric refractive index distribution, the elliptical core type polarization-maintaining optical fiber and the elliptical jacket type polarization-maintaining optical fiber have been described in the above embodiments, the invention is not limited to these. Alignment according to the present invention can be applied to polarization-maintaining optical fibers having an axially asymmetric refractive index distribution, such as so-called PANDA type, Bow-Tie type, and side-pit type, side-tunnel type optical fibers, or an absolute single polarization optical fiber and a multi-core optical fiber in which characteristic image processing results can be obtained depending on the rotational angle can be employed.

Figure 15:
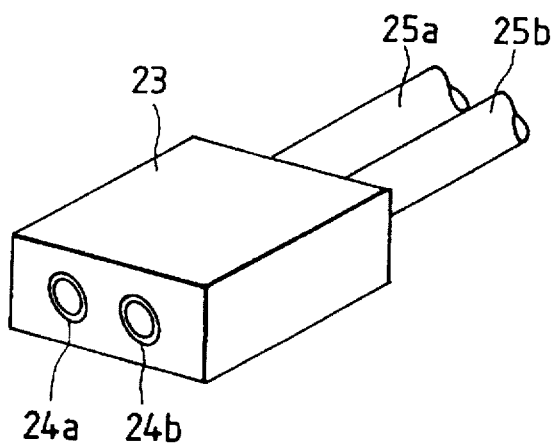
FIG. 15 is a view showing an embodiment of a modified holding member for use in the apparatus shown in FIG. 1.

Although description has been based on the use of a two-fiber optical fiber array as an example in the above embodiment, the invention is not limited to two-fiber arrangement, but can be applied to use of a multi-fiber or single fiber arrangement. The shape of the groove in the optical fiber holding member 3 may be U-shaped, arc-shaped, rectangular or polygonal. The optical fiber array may have a structure in which optical fibers 25a, 25b having an axially asymmetric refractive index distribution are inserted into two small holes 24a, 24b formed and arranged in a holding member 23 as shown in FIG. 15, and the cross-sectional shape of the small holes 24a, 24b may be circular, elliptical or polygonal.

In an optical fiber array having more than two fibers, in order to lessen the connection excessive loss with an optical waveguide due to a positional displacement lower than 0.1 dB, it is preferable if the diameter of the inside circle of the small holes 24a, 24b, at least at the portion where the end portions of the optical fibers are exposed, is larger than the outer diameter of the optical fiber at the portion where the coating is removed, by less than 2 μm.

Figure 16:
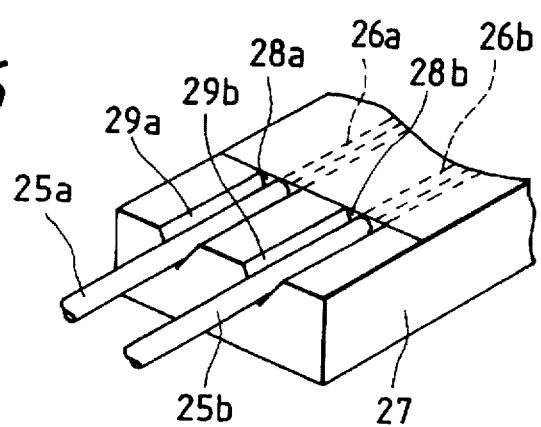
FIG. 16 is a view showing junctions of optical fibers and optical waveguides in which the optical fiber is engaged in a V-shaped groove formed in a base plate manufactured in such a way that the end surfaces of the optical waveguides are exposed.

Further, the rotational angle of the optical fibers 25a, 25b can be aligned using the method according to the present invention for a junction of an optical fiber and an optical waveguide where, as shown in FIG. 16, the optical fibers 25a, 25b having an axially asymmetric refractive index distribution are engaged to V-shaped grooves 29a, 29b formed and arranged in a base plate 27 manufactured and arranged to provide two optical waveguides 26a, 26b in such a manner that the end surfaces 28a, 28b of the optical waveguides 26a, 26b are exposed. In this case, similar to the case of the optical fiber array, the invention is not limited to a two-fiber arrangement, but can be also applied to a multi-fiber or single fiber arrangement. The shape of the groove formed in the base plate may be U-shaped, arc-shaped, rectangular or polygonal.

Figure 17:
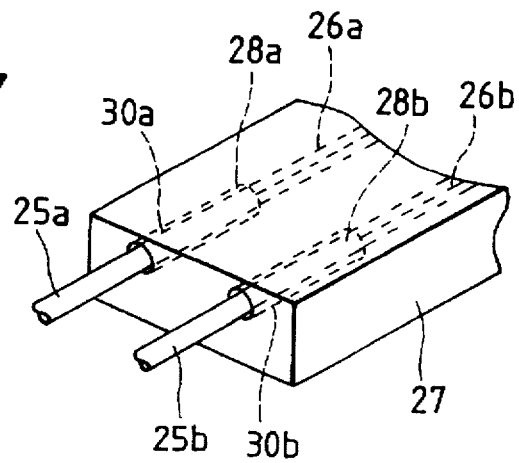
FIG. 17 is a view showing junctions of optical fibers and optical waveguides in which the optical fiber is inserted into an indention having a circular cross section formed in a base plate manufactured in such a way that the end surfaces of the optical waveguides are exposed.
Figure 18:
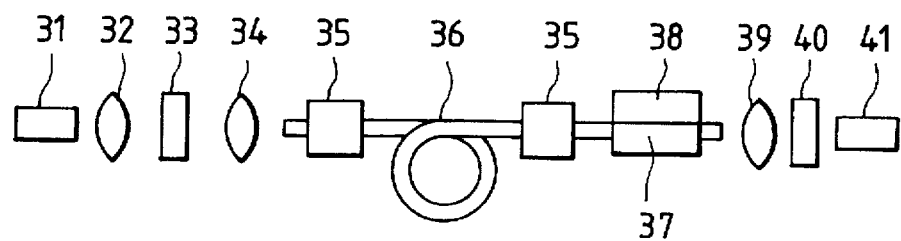
FIG. 18 is a schematic view showing a system for aligning the main axis of birefringence of a polarization-maintaining optical fiber in accordance with a conventional method.
Figure 19:
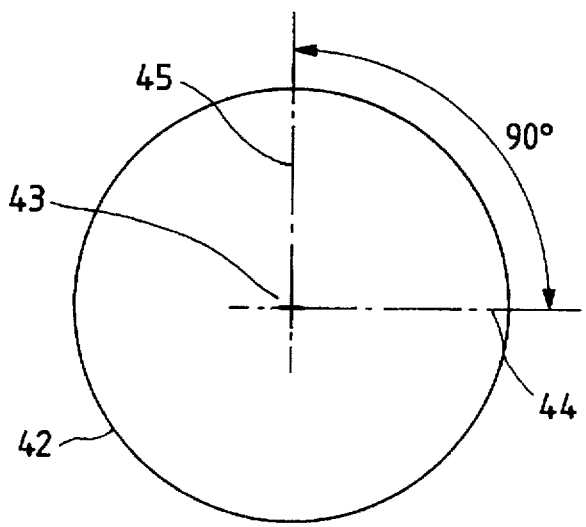
FIG. 19 is a diagrammatic view showing the main axis of birefringence of a conventional elliptical core type optical fiber.
Figure 20:
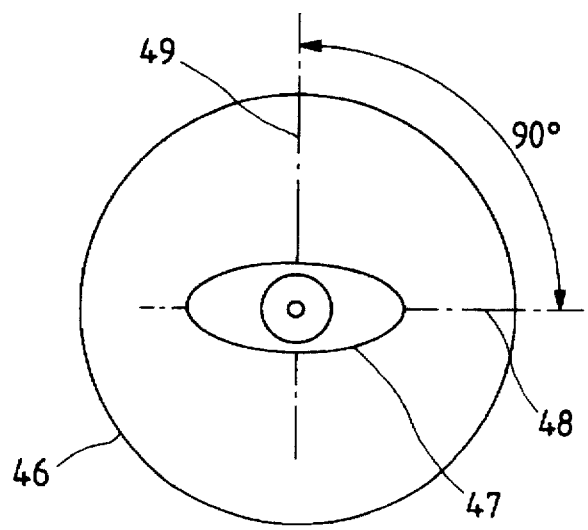
FIG. 20 is a diagrammatic view showing the main axis of birefringence of a conventional elliptical jacket type optical fiber.

The rotational angle of the optical fibers 25a, 25b can be aligned using the method according to the present invention for a junction of an optical fiber and an optical waveguide where, as shown in FIG. 17, the optical fibers 25a, 25b having an axially asymmetric refractive index distribution are inserted into indentions having a circular cross section 30a, 30b formed and arranged in a base plate 27 manufactured and arranged to provide two optical waveguides 26a, 26b in such a manner that the end surfaces 28a, 28b of the optical waveguides 26a, 26b are exposed. In this case, similar to the case of the optical fiber array, the invention is not limited to a two-fiber arrangement, but can be also applied to multi-fiber arrangement or single fiber. The shape of the groove formed in the base plate may be U-shaped, arc-shaped, rectangular or polygonal.

In order to lessen the connection excessive loss with an optical waveguide due to a positional displacement lower than 0.1 dB, it is preferable if the diameter of the inside circle of the indentions 30a, 30b, at least at the portion where the end portions of the optical fibers are exposed, is larger than the outer diameter of the optical fiber, at the portion where the coating is removed, by less than 2 μm.

As has been described above, according to the embodiments of the present invention, the following excellent effects can be attained.

It is possible to realize an alignment method, an optical fiber holding structure and an optical fiber junction in which the alignment of the rotational angle in a junction of an optical fiber, having an axially asymmetric refractive index, and an optical waveguide can be performed easily and in a short time without propagating light through the optical fiber, by viewing the optical fiber from a direction lateral to the propagating direction of guided light to obtain an enlarged image of the optical fiber, obtaining a distribution of the image characteristics corresponding to the radial positions of the optical fiber image from the obtained enlarged image, measuring the rotational angle around the center axis of the optical fiber, representing the rotational axis, from the distribution of the image characteristic, and rotating the optical fiber through a desired angle based on the measured result.

Figure 21:
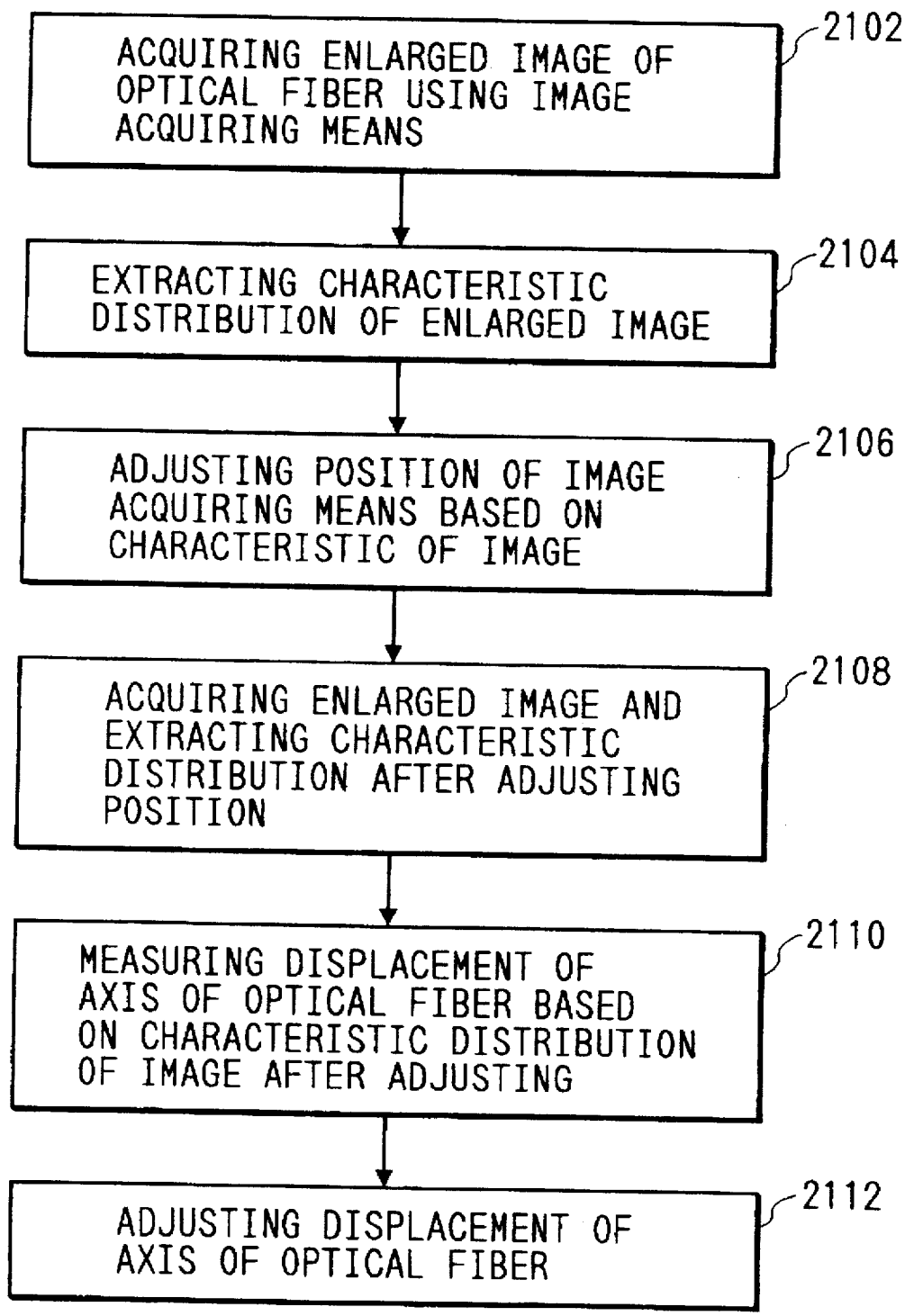
FIG. 21 is a flow chart showing the process flow in another embodiment of a method of aligning the rotational direction of an optical fiber in accordance with the present invention.

Another embodiment according to the present invention will be described in detail below, referring to FIG. 1 and FIG. 21 and the following figures.

As shown in FIG. 1, two optical fibers 1a, 1b, having their coating removed in the top end portions 2a, 2b, are mounted in two parallel V-shaped grooves 4a, 4b formed in an optical fiber holding member 3 and an ultraviolet-setting type adhesive (not shown) is applied thereto, this assembly being covered with a covering member 5. Since the rear end portions 2c, 2d of the polarization-maintaining optical fibers are attached to optical fiber rotating mechanisms 9a, 9b, operating as optical fiber rotating members, the top end portions 2a, 2b are rotatable substantially around the center axes of the cores of the optical fibers 1a, 1b.

Initially, the two optical fibers 1a, 1b, having the coating removed in the top end portions 2a, 2b, are mounted in the two V-shaped grooves 4a, 4b for supporting the optical fibers. The optical fiber (for example, 2a), the angle of the 10 main axis of birefringence of which is to be aligned, among the two polarization-maintaining optical fibers 1a, 1b, is placed nearly on the optical axis of an image pick-up camera 6 between the image pick-up camera 6 and a light source 8. Next, using the image pick-up camera 6 as an image obtaining means, the optical fiber is viewed from a direction lateral to the propagation direction of waveguided light to obtain an enlarged image of said optical fiber (Step 2102 of FIG. 21). That is, light is radiated from the light source 8 in the lateral direction from below the optical fiber 1a so as to cross the core, and the light passes through the optical fiber 1a to obtain an enlarged image of the top end portion of the optical fiber 1a, as shown in FIG. 22B and the subsequent figures, with the CCD image pick-up camera 6.

Then, a distribution of the image characteristic corresponding to the radial position of the optical fiber is obtained from the obtained enlarged image (Step 2104). That is, a distribution of light intensity corresponding to the radial position of the image of the optical fiber (not shown) can be calculated from the obtained data using an image processor 7. In the distribution of the light intensity, a characteristic curve having a different characteristic can be obtained by varying the angle between the optical axis of the image pick-up camera 6 and the main axis of birefringence. The reason for this is that the refractive index of each of the structural elements of the polarization-maintaining optical fiber, such as the core, the cladding and the jacket, are different from one another, and at least one of the shapes of the structures is asymmetric.

Next, in the distribution of the image characteristic, the image obtaining means is adjusted so that the image characteristic of the outer periphery of the optical fiber is maximized (Step 2106). That is, the distance L between the camera and the optical fiber is varied and adjusted so that the peaks l, r in the light intensity of the image at the outer periphery (side end portions) $S_L$, $S_R$ of the optical fiber are maximized among the whole enlarged image.

Then, a distribution of image the characteristic corresponding to the radial direction of the optical fiber is obtained from the obtained enlarged image (Step 2108). Further, the orientation of the rotating direction of the optical fiber around the center axis of the optical fiber, representing the rotational axis, is measured from the distribution of the image characteristic after adjustment (Step 2110). Therefore, by judging the angle of the main axis of birefringence using the image processor 7 and by driving the rotating mechanism 9a mounting the optical fiber 2a, the angle of the main axis of birefringence of which is to be aligned, using the controller 10, the angle of the main axis of birefringence and the positional displacement of the axis of the core can be aligned. The angle of the main axis of birefringence and the positional displacement of the axis of the core for the 5 optical fiber 2b can be also aligned in the same way.

Figure 22A:
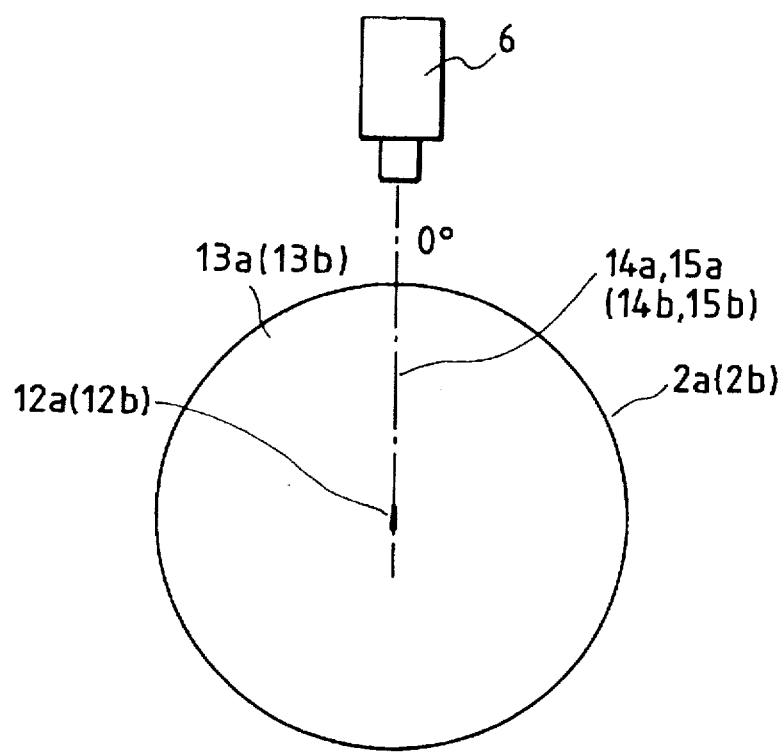
FIG. 22A is a schematic view showing an elliptical core type polarization-maintaining optical fiber where the angle between the optical axis of an image pick-up camera and the main axis of birefringence in the direction of the major axis of the elliptical core is 0°.
Figure 22B:
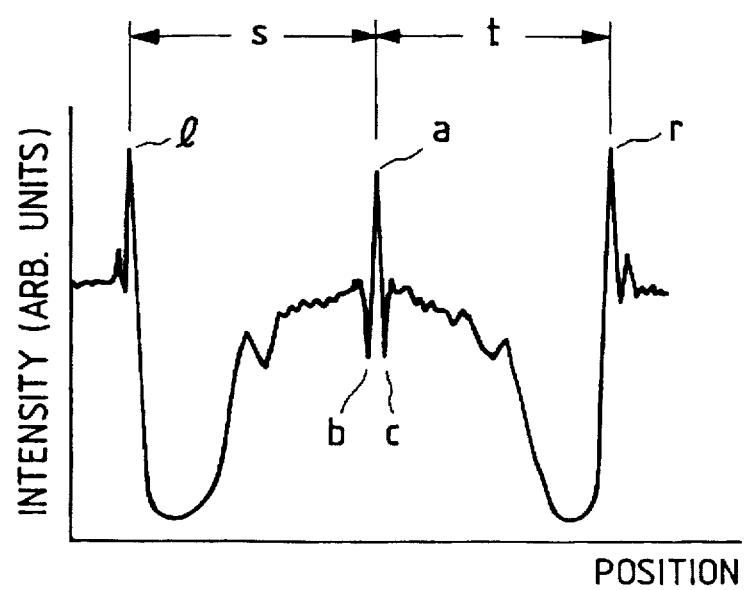
FIG. 22B is a graph showing the light intensity distribution under that condition.
Figure 23A:
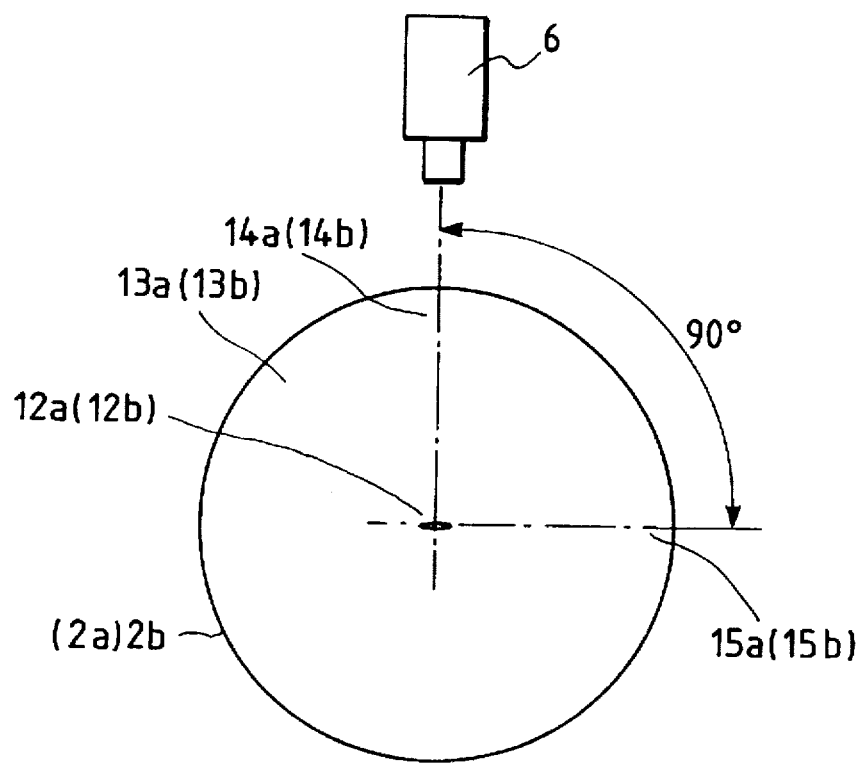
FIG. 23A is a schematic view showing an elliptical core type polarization-maintaining optical fiber where the angle between the optical axis of an image pick-up camera and the main axis of birefringence in the direction of the major axis of the elliptical core is 90°.
Figure 23B:
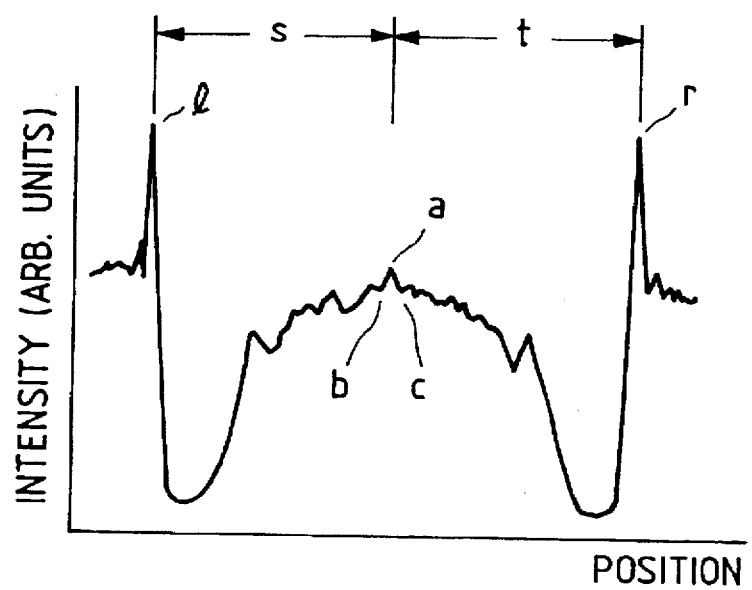
FIG. 23B is a graph showing the light intensity distribution under that condition.

FIG. 22A is a schematic view showing an elliptical core type polarization-maintaining optical fiber where the angle between the optical axis of an image pick-up camera and the main axis of birefringence in the direction of the major axis of the elliptical core is 0°, and FIG. 22B is a graph showing the light intensity distribution under that condition. FIG. 23A is a schematic view showing an elliptical core type polarization-maintaining optical fiber where the angle between the optical axis of an image pick-up camera and the main axis of birefringence in the direction of the major axis of the elliptical core is 90°, and FIG. 23B is a graph showing the light intensity distribution under that condition. Here, the distance between the image pick-up camera 6 and the optical fiber 2a is adjusted with a resolution of 0.5 μm in such a manner that the upward peak values l and r of the light intensity of the image in the outer peripheral portion $S_L$, $S_R$ of the optical fiber become maximum over the whole distribution of light intensity shown in FIG. 22B, that is, the light intensity of the image in the outer peripheral positions becomes larger than the light intensity at any other positions in the middle portion.

In a case where the optical axis 14a of the image pick-up camera 6 and the main axis of birefringence 15a are adjusted so as to be in parallel to each other (FIG. 22A), the upward peak value a of light intensity at the center portion of the optical fiber 2a becomes a maximum, as shown in FIG. 22B, and the downward peak values b, c appear at positions on both sides thereof, while the differences in the light intensities between a and b, and a and c are maximized. The distribution of the light intensity is nearly symmetric with regard to the position a, which corresponds to the center of the core 12a, as the axis of symmetry, and the difference in light intensities between the downward peak values b and c appearing at the nearly symmetric positions becomes a minimum.

On the other hand, when the optical fiber 2a is rotated so that the angle between the optical axis 14a and the main axis of birefringence 15a becomes 90° (FIG. 23A), as shown in 15 FIG. 23B, it is difficult to discriminate the upward peak value a and the downward peak values b, c, and the light intensity c and the light intensity b disappear. In a case where the angle between the optical axis 14a and the main axis of birefringence 15a is an angle excluding 0° and 90°, the difference in the light intensities between b and c becomes large, though this is not shown by any figure. Since the distribution of the light intensity in the vicinity of the center of the optical fiber obtained here reflects the shape of the elliptical core 12a, the difference between the refractive indexes of the core 12a and the cladding 13a and the angle between the optical axis 14a and the main axis of birefringence 15a, the position where the upward peak value a appears in FIG. 22A and FIG. 23A corresponds to the position of the center of the core 12a.

As described above, the positional axial displacement in the minor axis direction of the elliptical core 12a can be measured on the basis of the fact that characterized distributions of light intensity can be obtained corresponding to the angle of the main axis of birefringence 15, by using elliptical core type optical fibers as the two polarization-maintaining optical fibers 2a, 2b shown in FIG. 1, by adjusting the main axis of birefringence 15a in the major axis direction of the elliptical core 12a of one of the optical fiber 2a as shown in FIG. 22A, and by measuring the distance s between the left side edge of the outer periphery and the center of the core of the optical fiber 2a and the distance t between the right side edge of the outer periphery and the center of the core of the optical fiber 2a with pixel unit from the distribution of light intensity (22B). The positional axial displacement in this case has been found to be 0.65 μm to the right side of the center of the optical fiber 2a.

Figure 24:
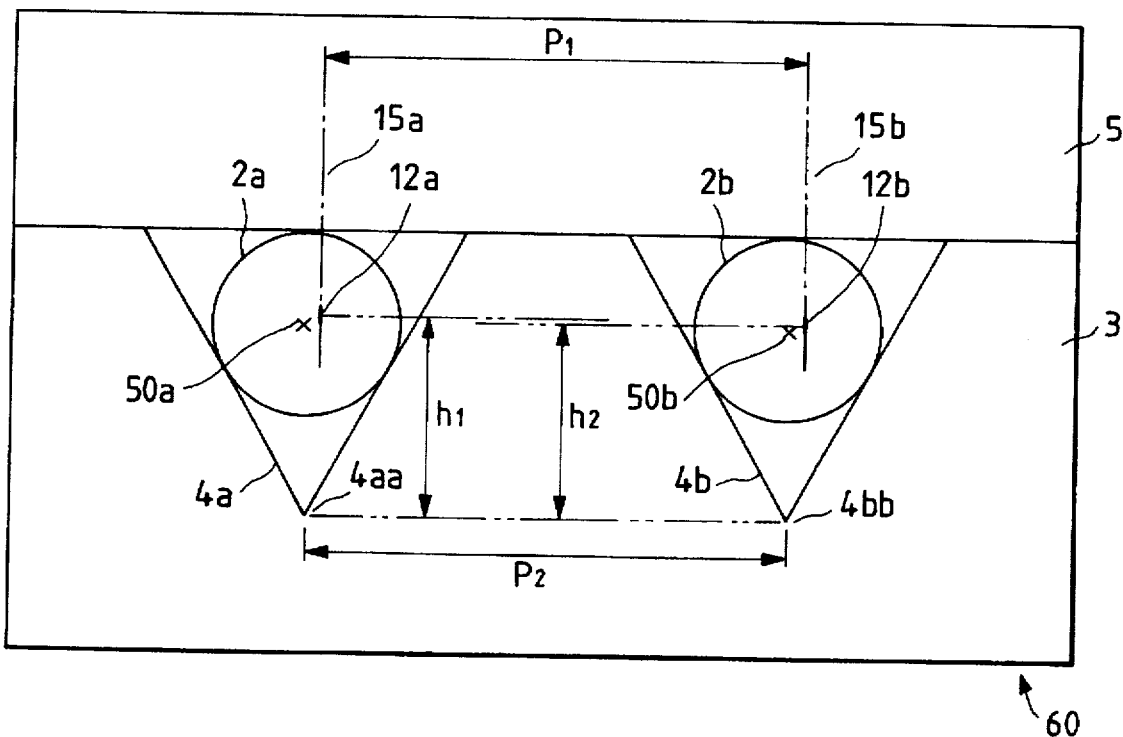
FIG. 24 is a diagrammatic view of the optical fiber array taken on the plane of the line A—A of FIG. 1.
Figure 27:
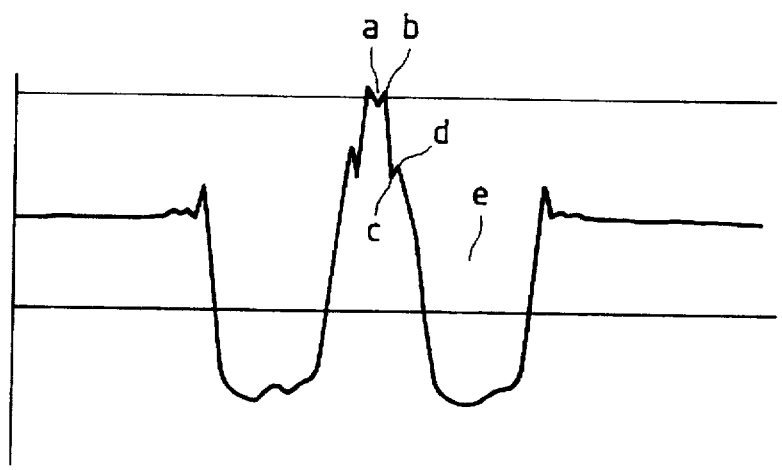
FIG. 27 is a view showing an example of the brightness profile of an image of an optical fiber in a conventional apparatus.

Next, the positional axial displacement of the other optical fiber 2b is measured by aligning the main axis of birefringence 15b in the major axis direction of the elliptical core 12b in the same way. The positional axial displacement has been found to be 0.59 μm. Therefore, a polarization-maintaining optical fiber array 60 shown in FIG. 24, can be manufactured by setting again the optical axis 14b and the main axis of birefringence 15b in parallel by rotating the optical fiber 2b by 180° so that the axial displacement is directed toward the right side, by hardening the adhesive by irradiating it with an ultra-violet ray, and by polishing the end surfaces of the optical fibers 2a, 2b, the holding member 3 and the cover member 5. FIG. 24 is a view of the optical fiber array taken on the plane of the line A—A of FIG. 1.

In FIG. 24, the main axes of birefringence 15a, 15b of the optical fibers 2a, 2b are perpendicular to the surface of the holding member 3 (parallel to the plane of the figure), the cores 12a, 12b are perpendicular to the surface of the holding member 3, and both of the cores 12a, 12b are displaced toward the right-upper side with respect to the centers 50a, 50b of the optical fibers 12a, 12b. Further, the difference between the spacing P1 between the two cores 12a, 12b and the spacing P2 between the two V-shaped grooves 4a, 4b can be reduced below 0.1 μm, and the difference between the height h1 of the core 12a taking the bottom end portion 4aa of the V-shaped groove 4a as a bottom reference, and the height h2 of the core 12b, taking the bottom end portion 4bb of the V-shaped groove 4b as a bottom reference can be reduced below 0.1 μm. The reason why the direction of the axial displacement in the major axis direction can be aligned only by aligning the orientation of the axial displacement in the minor direction of the elliptical cores 12a and 12b is that the optical fibers 2a and 2b are continuously cut from a string of one optical fiber.

After the rotational direction of the optical fiber 2a is aligned as in the embodiment described above, by rotating the optical fiber 2b by 90° in the same direction, an optical fiber array, in which the main axes of birefringence 15a, 15b are parallel to the surface of the holding member 3 and the directions of the axial displacement are aligned, can be manufactured. Further, an optical fiber array similar to the one described above can be manufactured by predetermining the orientations of the optical axes 14a, 14b in parallel to the surface of the holding member 3 (parallel to the plane of the figure) so that the orientations of the main axes of birefringence 15a, 15b become in parallel to the surface of the holding member 3 when the optical axes 14a and 14b are aligned in parallel to the main axes of birefringence 15a, 15b.

Similarly, in the case where the angle between the main axis of birefringence 15 and the major axis direction of the elliptical core 12a (12b) of the optical fiber 2a (2b) is aligned at 90°, as shown in FIG. 23A, it is possible to manufacture an optical fiber array in which the main axes of birefringence 15a, 15b are parallel to the surface of the holding member 3 and the positional axial displacements are aligned by measuring the distances between the left side edge of the outer periphery and the center of the core of the optical fiber 2a (2b) and the distance t between the right side edge of the outer periphery and the center of the core of the optical fiber 2a (2b) with a pixel unit from the distribution of light intensity (FIG. 23B), and measuring the positional axial displacement in the major direction of the elliptical core 12a (12b).

A case where an elliptical jacket type polarization-maintaining optical fiber 16 is used as the optical fiber will be described below.

Figure 25A:
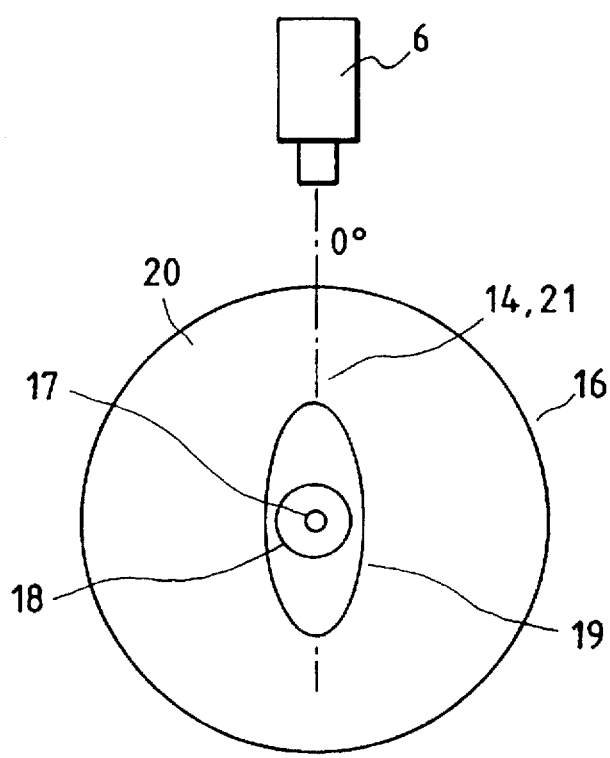
FIG. 25A is a schematic view showing an elliptical jacket type polarization-maintaining optical fiber where the angle between the optical axis of an image pick-up camera and the main axis of birefringence in the direction of the major axis of the elliptical jacket is 0°.
Figure 25B:
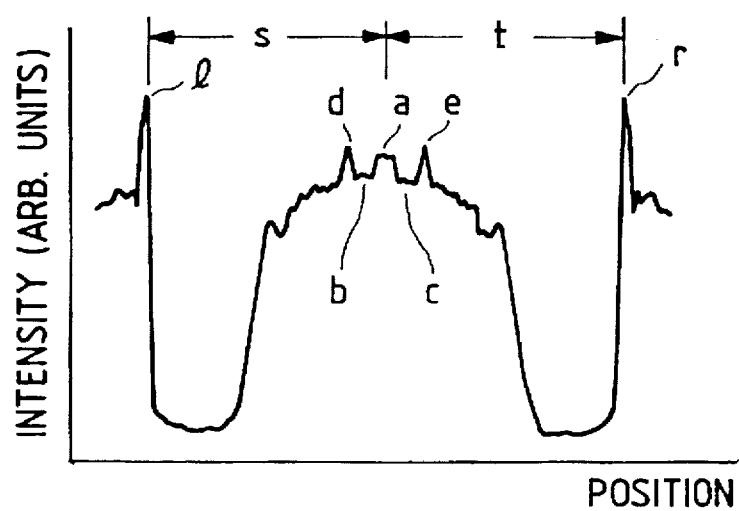
FIG. 25B is a graph showing the light intensity distribution under that condition.
Figure 26A:
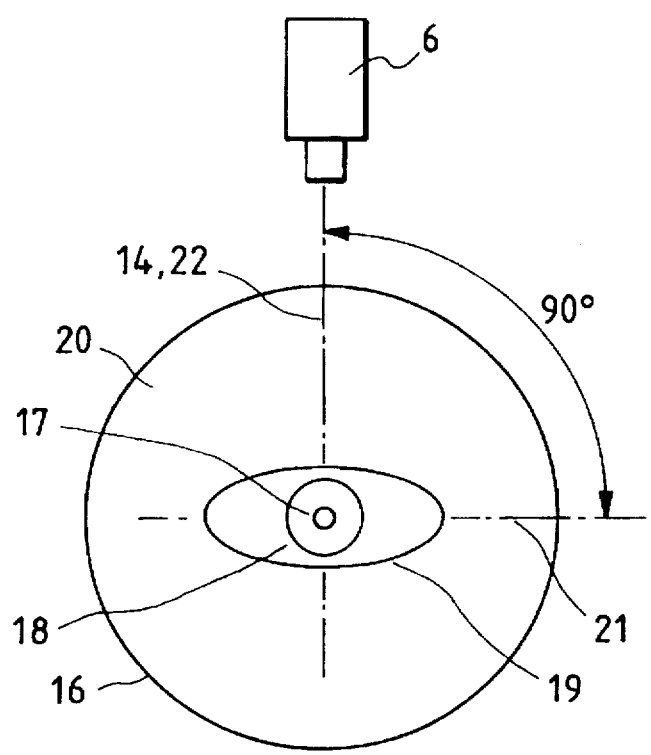
FIG. 26A is a schematic view showing an elliptical jacket type polarization-maintaining optical fiber where the angle between the optical axis of an image pick-up camera and the main axis of birefringence in the direction of the major axis of the elliptical jacket is 90°.
Figure 26B:
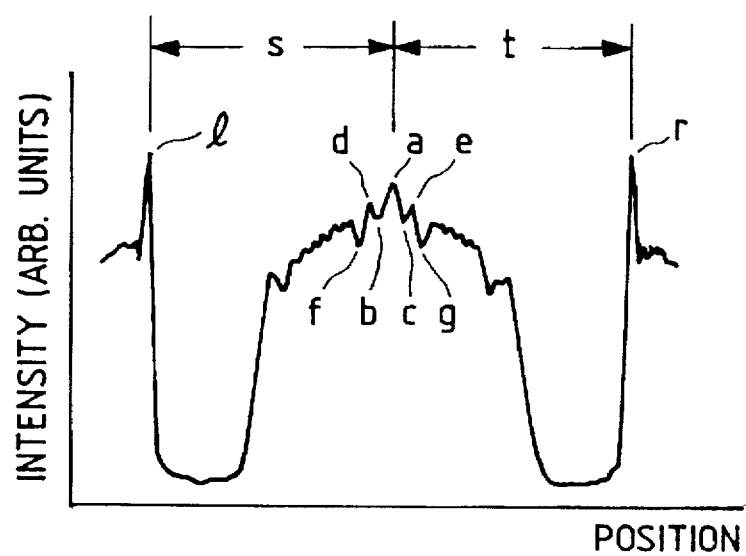
FIG. 26B is a graph showing the light intensity distribution under that condition.

FIG. 25A is a schematic view showing an elliptical jacket type polarization-maintaining optical fiber where the angle between the optical axis of an image pick-up camera and the main axis of birefringence in the direction of the major axis of the elliptical jacket is 0°, and FIG. 25B is a graph showing the light intensity distribution under that condition. FIG. 26A is a schematic view showing an elliptical jacket type polarization-maintaining optical fiber where the angle between the optical axis of an image pick-up camera and the main axis of birefringence in the direction of the major axis of the elliptical jacket is 90°, and FIG. 26B is a graph showing the light intensity distribution under that condition. The distance between the image pick-up camera 6 and the optical fiber 16 is adjusted with a resolution of 0.5 μm in the position 10 μm apart from the distance where the upward peak values l and r of the light intensity of the image become larger than a maximum over the whole distribution of the light intensity, as shown in FIG. 25B, that is, the light intensity of the image in the outer peripheral positions becomes larger than the light intensity at any other positions in the middle portion.

In a case where, as shown in FIG. 25A, the optical axis 14 and the main axis of birefringence 15 in the major axis direction of the elliptical jacket are in parallel, as shown in FIG. 25B, the distribution of the light intensity is nearly symmetric with regard to the bright portion a, which corresponds to the center of the core 12, as the axis of symmetry, and a pair of bright portions d, e appear at nearly symmetric positions with respect to the axis in the vicinity of the center of the optical fiber, while the difference between the light intensifies is minimized. Further, a pair of dark portions b, c appear at positions in the inner peripheral side of these bright portions d, e of the optical fiber in nearly symmetrical portions with respect to the center of the bright portion a corresponding to the center of the core representing the axis of symmetry, but clearly dark portions having lower light intensity than the outer periphery do not appear in the vicinity of the outer side of the bright portions d, e.

On the other hand, in a case where, as shown in FIG. 26A, the angle between the optical axis 14 and the main axis of birefringence 15 is 90°, that is, in a case where the optical axis 14 and the main axis of birefringence 22 in the minor axis direction of the elliptical jacket are parallel, as shown in FIG. 26B, the distribution of the light intensity is nearly symmetric with respect to the bright portion a corresponding to the center of the core. And, a pair of bright portions d, e appear at nearly symmetric positions with respect to the center of the bright portion a in the vicinity of the center of the optical fiber, and a pair of dark portions b, c appear at positions on the inner peripheral side of these bright portions d, e of the optical fiber in nearly symmetrical positions, and a pair of clearly dark portions f, g having a lower light intensity than the outer periphery do not appear in the vicinity of the outer side of the bright portions d, e. In a case where the angle between the optical axis 14a and the main axis of birefringence 15a is an angle excluding 0° and 90°, the symmetry in the distribution of light intensity disappears, though this is not shown by any figure.

As described above, similar to the case of an elliptical core type polarization-maintaining optical fiber, it is possible to manufacture an optical fiber array in which the main axes of birefringence are aligned and the positional axial displacements are aligned based on the fact that the characterized distributions of light intensity can be obtained corresponding to the orientation of the main axis of birefringence 21 or the main axis of birefringence 22, by using elliptical jacket type optical fibers as the two polarization-maintaining optical fibers 2a, 2b shown in FIG. 1, by adjusting the main axis of birefringence 21 or the main axis of birefringence 22 of the elliptical jacket 19 of one of the optical fiber 16 as shown in FIG. 25A or FIG. 1. 26A, and by measuring the distance s between the left side edge of the outer periphery and the center of the core of the optical fiber 16 and the distance t between the right side edge of the outer periphery and the center of the core of the optical fiber 16 with pixel unit from the distribution of light intensity (FIG. 25B or 26B).

As an optical fiber, an elliptical core type polarization-maintaining optical fiber and an elliptical jacket type polarization-maintaining optical fiber have been employed in the above embodiments. However, since polarization-maintaining optical fibers having an axially asymmetric refractive index distribution such as so-called PANDA type, Bow-Tie type, side-pit type, and side-tunnel type optical fibers, or an absolute single polarization optical fiber and a multi-core optical fiber can produce characteristic image processing results depending on the rotational angle, it is possible to manufacture an optical fiber array by setting a predetermined specific axis on the cross-sectional surface of the optical fiber and the optical axis of an image pick-up camera in parallel, by measuring the positional axial displacement in the direction perpendicular to the specific axis at that position, and by aligning the rotational direction of the optical fiber while taking into consideration the specific axis and the positional axial displacement.

In a case of manufacturing an optical fiber array using an optical fiber having a nearly axially symmetric refractive index distribution, such as a single mode optical fiber, it is possible to measure the distance from the outer periphery to the center of the core of the optical fiber in any arbitrary direction with pixel units, although the distribution of light intensity is nearly the same for any orientation of the rotational direction.

Therefore, since the positional axial displacement of each of optical fibers can be measured by repeating measurement of the positional axial displacement to the center of the optical fiber in the core center while the optical fiber is being rotated around its center, it is possible to manufacture an optical fiber array by aligning the rotational direction of the optical fiber while taking into consideration the positional axial displacement.

Although an embodiment has been described taking a two-fiber optical fiber array as an example, the invention is not limited to a two-fiber arrangement, but three-fibers or more may be applicable.

According to the embodiments of the present invention which have been described above, the following excellent effects 5 can be attained.

It is possible to manufacture an optical fiber array in which the spacing between the cores of adjacent optical fibers and the distance from the surface of an optical fiber holding member to the cores are uniform.

The connecting loss due to the positional displacement between the optical fiber array and the optical waveguide array can be decreased.

The production yield of the optical fiber array can be improved, and accordingly the cost can be decreased.

The requirement as to the axial displacement in an optical fiber to be used for an optical fiber array can be moderated, and accordingly the production yield of the optical fiber is improved and the production cost can be decreased.

What is claimed is:

1. An optical fiber holding structure having a holding member for holding at least one optical fiber having an axially asymmetric refractive index distribution, wherein said optical fiber is viewed from a direction lateral to the propagating direction of guided light in the optical fiber using an image obtaining means to obtain an enlarged image of said optical fiber, a distribution of image characteristics corresponding to different radial positions of the optical fiber image is obtained from the obtained enlarged image, the image obtaining means is adjusted so that the image characteristics at outer peripheral portions of the optical fiber are maximized in the distribution of image characteristics, an orientation of the rotational direction around the center axis of the optical fiber serving as a rotational axis is measured from the distribution of the image characteristics after said adjusting, and the orientation of the rotational direction of the optical fiber is aligned with an optical fiber rotating member based on the measured result.

2. An arrangement for orienting a junction coupling at least one optical fiber having an axially asymmetric refractive index distribution and at least one optical wave-guide, comprising image obtaining means for viewing said optical fiber from a direction lateral to the propagating direction of guided light in the optical fiber to obtain an enlarged image of said optical fiber, means for obtaining a distribution of image characteristics corresponding to different radial positions of the optical fiber image from the obtained enlarged image, the image obtaining means being positioned with respect to the optical fiber so that the image characteristics at outer peripheral portions of the optical fiber are maximized in said distribution of image characteristics, means for measuring an orientation of the rotational direction around the center axis of the optical fiber serving as a rotational axis from the distribution of the image characteristics, and means for aligning the orientation of the rotational direction of the optical fiber using an optical fiber rotating member based on a measured result produced by said measuring means.

3. An arrangement for orienting an optical fiber array having a plurality of optical fibers and an optical fiber holding member, comprising:

image obtaining means for obtaining an enlarged lateral image of each of the optical fibers, means for obtaining a distribution of image characteristics corresponding to different radial positions of each optical fiber image from the obtained enlarged images, the image obtaining means being positioned with respect to said optical fibers so that the image characteristics at outer peripheral portions of each optical fiber are maximized in each distribution of the image characteristics, means for measuring an axial displacement of the core center with respect to the center of an optical fiber from a distribution of image characteristics after said adjusting, and means for adjusting the pitches of cores or making them uniform by aligning said axial displacement with respect to the optical fiber holding member using an optical fiber rotating mechanism.

4. An arrangement for an optical fiber array according to claim 3, wherein all of said optical fibers are manufactured by continuously cutting one string of optical fiber, and the alignment of the orientation of the rotational direction of the optical fiber is performed by said adjusting means so that the axial displacement is directed to a desired direction.

5. A method of aligning optical fibers having an axially asymmetric refractive index distribution or of aligning an optical fiber to an optical element in a junction, the method comprising the steps of:

viewing said optical fiber from a direction lateral to the propagating direction of guided light in the optical fiber using an image obtaining means to obtain an enlarged image of said optical fiber;

obtaining a distribution of image characteristics corresponding to radial positions of the optical fiber image from the obtained enlarged image;

adjusting the image obtaining means so that the image characteristics at outer peripheral portions of the optical fiber are maximized in said distribution of image characteristics;

measuring an orientation of the rotational direction around the center axis of the optical fiber from said distribution of image characteristics after said adjusting; and aligning the orientation of the rotational direction of the optical fiber using an optical fiber rotating member based on the measured result.

6. A method of aligning an optical fiber having an axially asymmetric refractive index distribution according to claim 5, wherein the direction of a preset specific axis on the cross-sectional surface of the optical fiber is aligned by rotating the optical fiber after said specific axis is once aligned in parallel to the optical axis of the image obtaining means by repeatedly obtaining enlarged images of the optical fiber from various rotational directions around the center axis of the optical fiber, extracting the distributions of image characteristics for each image and, at the same time, detecting the orientation of the rotational direction of the optical fiber based on preset distributions of image characteristics.

7. A method of aligning an optical fiber having an axially asymmetric refractive index distribution according to claim 5, wherein the direction of the optical axis of said image obtaining means to an optical element, including at least one of an optical wave-guide or an optical fiber holding member, is determined, so that the direction of a preset specific axis on the cross-sectional surface of the optical fiber is oriented in a desired direction with respect to the optical medium or the optical fiber holding member when the direction of said specific axis is aligned in parallel to the optical axis of the image obtaining means, by repeatedly obtaining enlarged images of the optical fiber from various rotational directions around the center axis of the optical fiber, extracting the distributions of image characteristics for each image and, at the same time, detecting the orientation of the rotational direction of the optical fiber based on preset distributions of image characteristics.

8. A method of aligning an optical fiber having an axially asymmetric refractive index distribution according to any one of claim 6 or claim 7, wherein said optical fiber is an elliptical core type optical fiber, said distribution of the image characteristics is a distribution of light intensity, said specific axis is the major axis of the elliptical core, the major axis of the core being aligned in parallel to the optical axis of the image obtaining means by detecting a direction in which the upward peak value of the light intensity is nearly maximized or the downward peak value of the light intensity is nearly minimized in the middle portion of the optical fiber and its vicinity.

9. A method of aligning an optical fiber having an axially asymmetric refractive index distribution according to any one of claim 6 or claim 7, wherein said optical fiber is an elliptical core type optical fiber, said distribution of the image characteristics is a distribution of light intensity, said specific axis is the major axis of the elliptical core, the major axis of the core being aligned in parallel to the optical axis of the image obtaining means by detecting a direction in which the difference between the upward peak value and the downward peak value of the light intensities in the middle portion of the optical fiber and its vicinity is maximized.

10. A method of aligning an optical fiber having an axially asymmetric refractive index distribution according to any one of claim 6 or claim 7, wherein said optical fiber is an elliptical core type optical fiber, said distribution of the image characteristics is a distribution of light intensity, and said specific axis is the major axis of the elliptical core, the major axis of the core being aligned in parallel to the optical axis of the image obtaining means by detecting a direction in which the upward peak value of the light intensity is nearly maximized or the downward peak value of the light intensity is nearly minimized in the middle portion of the optical fiber and its vicinity, the distribution of the image characteristic being nearly symmetrical to the center of the core forming an axis of symmetry, the difference in at least one pair of downward peak values or upward peak values of light intensities appearing at the nearly symmetrical positions with respect to the center axis of the core in the vicinity of the central portion of the optical fiber being minimized.

11. A method of aligning an optical fiber having an axially asymmetric refractive index distribution according to any one of claim 6 or claim 7, wherein said optical fiber is an elliptical jacket type optical fiber, said distribution of the image characteristics is a distribution of light intensity, said specific axis is any one of the major axis and the minor axis of the elliptical jacket of the optical fiber, the distribution of the image characteristics are nearly symmetrical with respect to the center axis of the core serving as an axis of symmetry, any one of the major axis and the minor axis of said elliptical jacket being aligned in parallel to the optical axis of the image obtaining means by detecting a rotational direction of the optical fiber in which the difference in at least one pair of bright portions or dark portions of light intensities, among bright portions and dark portions appearing at nearly symmetrical positions with respect to the center axis of the core in the vicinity of the central portion of the optical fiber, is minimized.

12. A method of aligning an optical fiber having an axially asymmetric refractive index distribution according to claim 11, wherein said specific axis is the minor axis of an elliptical jacket, and when the direction of said minor axis is aligned in parallel to the optical axis of said image obtaining means, the distribution of the image characteristics includes a pair of bright portions at positions nearly symmetrical to the center of the core serving as an axis of symmetry, a pair of dark portions in the inner sides of the bright portions of the optical fiber and at positions nearly symmetrical with respect to the center of the core and a pair of clearly dark portions in the vicinity of the outer sides of the bright portions and at positions nearly symmetrical with respect to the center axis of the core having a lower light intensity than that in the outer peripheral sides.

13. A method of aligning an optical fiber having an axially asymmetric refractive index distribution according to claim 11, wherein said specific axis is the major axis of an elliptical jacket of the optical fiber, and when the direction of said major axis is aligned in parallel to the optical axis of said image obtaining means, the distribution of image characteristics includes a pair of bright portions at positions nearly symmetrical with respect to the center of the core serving as an axis of symmetry, a pair of dark portions in the inner sides of the bright portions of the optical fiber and at positions nearly symmetrical with respect to the center of the core and, no clearly dark portions in the vicinity of the outer sides of the bright portions having a lower light intensity than portions in the outer peripheral sides.

14. A method of aligning an optical fiber having an axially asymmetric refractive index distribution according to claim 5, wherein said image obtaining means is an image pick-up camera.

15. A method of aligning an optical fiber having an axially asymmetric refractive index distribution according to claim 5, wherein the resolution limited by an image input means placed at the image forming plane of said image obtaining means is smaller than 1.6 µm.

16. A method of aligning an optical fiber having an axially asymmetric refractive index distribution according to claim 5, wherein said optical fiber and a light source are arranged substantially in a plane through the optical axis of said image obtaining means so as to sandwich said optical fiber between said image obtaining means and said light source, light being radiated from a lateral side of said optical fiber in a direction crossing the core of the optical fiber, an image of the optical fiber being obtained with transmitted light passing through the optical fiber.

17. A method of aligning an optical fiber having an axially asymmetric refractive index distribution according to claim 5, wherein said optical fiber is an elliptical core type optical fiber, said distribution of image characteristics is a distribution of light intensity, and the distance between the image obtaining means and the optical fiber is adjusted with a resolution smaller than 5 µm.

18. A method of aligning an optical fiber having an axially asymmetric refractive index distribution according to claim 5, wherein said optical fiber is an elliptical jacket type optical fiber, said distribution of the image characteristics is a distribution of light intensity, the distance between the image obtaining means and the optical fiber is within a range between a position where a upward peak value of the light intensity of the image in the periphery of the optical fiber, excluding the vicinity of the core, is maximized and a position where the image obtaining means and the optical fiber are spaced from said position nearly by 50 µm.

19. A method of aligning orientations of the rotational direction of optical fibers in an optical fiber array having a plurality of optical fibers and an optical fiber holding member, the method comprising the steps of:

obtaining an enlarged image of a lateral view of each of the optical fibers using an image obtaining means;

obtaining a distribution of image characteristics corresponding to different radial positions of the optical fiber images from each of the obtained enlarged images;

adjusting the image obtaining means so that image characteristics at outer peripheral portions of each optical fiber are maximized in each distribution of image characteristics;

measuring an axial displacement of the core center to the center of the optical fiber from said distribution of image characteristics after said adjusting; and aligning the axial displacement with respect to the optical fiber holding member using an optical fiber rotating mechanism.

20. A method of aligning orientations of the rotational direction of optical fibers in an optical fiber array having a plurality of optical fibers and an optical fiber holding member, the method comprising the steps of:

obtaining an enlarged image of a lateral view of each of the optical fibers using an image obtaining means;

obtaining a distribution of image characteristics corresponding to different radial positions of the optical fiber images from each of the obtained enlarged images;

measuring an axial displacement of the core center to the center of the optical fiber from said distribution of image characteristics; and aligning the axial displacement with respect to the optical fiber holding member using an optical fiber rotating mechanism.

21. A method of aligning orientations of the rotational direction of optical fibers in an optical fiber array having a plurality of optical fibers and an optical fiber holding member, the method comprising the steps of:

obtaining enlarged images of a lateral view of at least one optical fiber using an image obtaining means;

obtaining a respective distribution of image characteristics corresponding to each of a plurality of radial positions of the optical fiber image from the obtained enlarged images;

adjusting the image obtaining means so that image characteristics at outer peripheral portions of the optical fiber are maximized in said distribution of image characteristics;

measuring an axial displacement of the core center of the optical fiber to the center of the optical fiber for said optical fiber using at least two of said distributions of image characteristics of the optical fiber with varying viewing angles for each of the optical fibers after said adjusting; and aligning said axial displacement with respect to the optical fiber holding member using an optical fiber rotating mechanism by rotating the optical fiber with respect to the holding member.

22. A method of aligning orientations of the rotational direction of optical fibers in an optical fiber array having a plurality of optical fibers having an axially asymmetric refractive index distribution and an optical fiber holding member, the method comprising the steps of:

obtaining enlarged images of an optical fiber in various rotational directions with respect to the center axis of the optical fiber from a direction lateral to the propagating direction of guided wave in the optical fiber for each of the optical fibers using an image obtaining means;

obtaining a distribution of image characteristics corresponding to the radial positions of the optical fiber image from the obtained enlarged images;

aligning a predetermined specific axis on the cross-sectional plane of the optical fiber to the optical axes of the image obtaining means by detecting an orientation of the rotational direction of the optical fiber which will exhibit a predetermined distribution of image characteristics;

measuring an axial displacement of the core center with respect to the center of the optical fiber from the distribution of the image characteristics; and then aligning the orientation of the specific axis and the axial displacement with respect to the optical fiber holding member for each of the optical fibers by rotating the optical fiber or the holding member for holding the optical fiber.

23. A method of aligning orientations of the rotational direction of optical fibers in an optical fiber array having a plurality of optical fibers having an axially asymmetric refractive index distribution and an optical fiber holding member, the method comprising the steps of:

obtaining enlarged images of an optical fiber in various rotational directions with respect to the center axis of the optical fiber from a direction lateral to the propagating direction of guided wave in the optical fiber for each of the optical fibers using an image obtaining means;

obtaining a distribution of image characteristics corresponding to the radial positions of the optical fiber image from the obtained enlarged images;

aligning a predetermined specific axis on the cross sectional plane of the optical fiber to the optical axis of the image obtaining means by detecting an orientation of the rotational direction of the optical fiber which will exhibit a predetermined distribution of image characteristics;

measuring an axial displacement of the core center with respect to the center of the optical fiber from the distribution of the image characteristics; and aligning or presetting the optical axis of the image obtaining means to the holding member for each of the optical fibers so that the orientation of the specific axis of each of the optical fibers is directed in a desired direction with respect to the optical fiber holding member when the specific axes of all the optical fibers are aligned in parallel to the optical axis of the image obtaining means by rotating the optical fibers by 180° to positions of axial displacement which do not agree with the desired positions or with the positions of axial displacement of more than a half-number of the optical fibers.

24. A method of aligning orientations of the rotational direction of optical fibers in an optical fiber array according to any one of claim 19 to claim 23, wherein said distribution of image characteristics is a distribution of light intensity, and the position of axial displacement is measured from the distance between a bright portion or dark portion corresponding to the outer periphery of the optical fiber and a bright portion or dark portion corresponding to the core or the center of the core.

25. A method of aligning orientations of the rotational direction of optical fibers in an optical fiber array according to any one of claim 22 and claim 23, wherein said optical fiber is a polarization-maintaining optical fiber, and said specific axis is a main axis of birefringence of the optical fiber.

26. A method of aligning orientations of the rotational direction of optical fibers in an optical fiber array according to claim 25, wherein said optical fiber is an elliptical core type polarization-maintaining optical fiber.

27. A method of aligning orientations of the rotational direction of optical fibers in an optical fiber array according to claim 25, wherein said optical fiber is an elliptical jacket type polarization-maintaining optical fiber.

* * * * *